US012028693B2

(12) United States Patent
Ham et al.

(10) Patent No.: US 12,028,693 B2
(45) Date of Patent: *Jul. 2, 2024

(54) DISPLAY APPARATUS

(71) Applicant: LG Display Co., Ltd., Seoul (KR)

(72) Inventors: Sungsu Ham, Paju-si (KR); YeongRak Choi, Paju-si (KR); Sungtae Lee, Paju-si (KR); Joongsup Han, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/204,820

(22) Filed: Jun. 1, 2023

(65) Prior Publication Data

US 2023/0308805 A1 Sep. 28, 2023

Related U.S. Application Data

(63) Continuation of application No. 17/744,603, filed on May 13, 2022, now Pat. No. 11,706,567, which is a (Continued)

(30) Foreign Application Priority Data

Sep. 18, 2018 (KR) ........................ 10-2018-0111570
Jun. 26, 2019 (KR) ........................ 10-2019-0076528

(51) Int. Cl.

*H04R 5/02* (2006.01)
*H04R 5/04* (2006.01)
*H04S 3/00* (2006.01)

(52) U.S. Cl.

CPC ................. *H04R 5/02* (2013.01); *H04R 5/04* (2013.01); *H04S 3/008* (2013.01); *H04R 2499/15* (2013.01); *H04S 2400/01* (2013.01)

(58) Field of Classification Search

CPC ........ H04R 5/02; H04R 5/04; H04R 2499/15; H04S 3/008; H04S 2400/01

(Continued)

(56) References Cited

U.S. PATENT DOCUMENTS 8,879,766 B1 11/2014 Zhang
11,019,430 B2 5/2021 Ham et al.

(Continued)

FOREIGN PATENT DOCUMENTS

CN 2387687 Y 7/2000
CN 1547416 A 11/2004

(Continued)

OTHER PUBLICATIONS

First Notification of Office Action dated Nov. 3, 2020, issued in corresponding Chinese Patent Application No. 201910864509.3.

(Continued)

*Primary Examiner* — Ammar T Hamid

(74) *Attorney, Agent, or Firm* — Morgan, Lewis & Bockius LLP

(57) ABSTRACT

A display apparatus is capable of outputting a stereo sound. The display apparatus includes a display panel configured to display an image; a sound generating device on a rear surface of the display panel; a rear cover on the rear surface of the display panel and configured to support the sound generating device; a partition member between the rear surface of the display panel and the rear cover and configured to divide the display panel into first, second, third, fourth and fifth areas; and first, second, third, fourth, and fifth sound generating devices attached to the rear surface of the display panel and configured to vibrate the display panel. The first, second, third, fourth and fifth sound generating devices are in the first, second, third, fourth and fifth areas, respectively.

20 Claims, 25 Drawing Sheets

Related U.S. Application Data continuation of application No. 17/235,611, filed on Apr. 20, 2021, now Pat. No. 11,363,381, which is a continuation of application No. 16/574,605, filed on Sep. 18, 2019, now Pat. No. 11,019,430.

(58) Field of Classification Search
USPC .................................................. 381/310, 306
See application file for complete search history.

(56) References Cited

U.S. PATENT DOCUMENTS

| | | | | |
|---|---|---|---|---|
| 11,363,381 | B2 | 6/2022 | Ham et al. | |
| 11,706,567 | B2 * | 7/2023 | Ham | H04S 3/008 381/306 |
| 2001/0040976 | A1 | 11/2001 | Buos | |
| 2001/0043714 | A1 | 11/2001 | Asada et al. | |
| 2005/0025330 | A1 | 2/2005 | Saiki et al. | |
| 2006/0227981 | A1 | 10/2006 | Miyata | |
| 2012/0243719 | A1 * | 9/2012 | Franklin | H04R 1/02 381/333 |
| 2013/0101152 | A1 | 4/2013 | Chen | |
| 2016/0050472 | A1 | 2/2016 | Lee et al. | |
| 2016/0150318 | A1 | 5/2016 | Donarski et al. | |
| 2017/0280216 | A1 | 9/2017 | Lee et al. | |
| 2017/0280234 | A1 * | 9/2017 | Choi | H04R 1/025 |
| 2020/0077169 | A1 * | 3/2020 | Noh | H04R 5/02 |

FOREIGN PATENT DOCUMENTS

| | | | |
|---|---|---|---|
| CN | 1581891 | A | 2/2005 |
| CN | 103067812 | A | 4/2013 |
| CN | 103416043 | A | 11/2013 |
| CN | 105451122 | A | 3/2016 |
| CN | 106797514 | A | 5/2017 |
| CN | 107241675 | A | 10/2017 |
| CN | 206993387 | U | 2/2018 |
| CN | 108124218 | A | 6/2018 |
| CN | 108124224 | A | 6/2018 |
| EP | 2268060 | A | 12/2010 |
| EP | 3 264 167 | A1 | 1/2018 |
| EP | 3 331 251 | A1 | 6/2018 |
| EP | 3330780 | A | 6/2018 |
| EP | 3 396 972 | A1 | 10/2018 |
| EP | 3 402 216 | A1 | 11/2018 |
| EP | 3734996 | A1 | 11/2020 |
| JP | H11234772 | A | 8/1999 |
| JP | 2005-110216 | A | 4/2005 |
| JP | 2011-502456 | A | 1/2011 |
| JP | 2014-509028 | A | 4/2014 |
| JP | 2017-531393 | A | 10/2017 |
| JP | 2018-093469 | A | 6/2018 |
| KR | 2007108035 | A * | 11/2007 |
| KR | 10-2016-0021941 | A | 2/2016 |
| KR | 10-2018-0062320 | A | 6/2018 |
| WO | 2012/129247 | A | 3/2011 |

OTHER PUBLICATIONS

Examination Report dated Oct. 21, 2021, issued in corresponding UK Patent Application No. 1913454.3.

Office Action issued in corresponding Taiwanese Divisional Patent Application No. 11220678830, dated Jul. 12, 2023.

Office Action dated Nov. 9, 2020, issued in corresponding Taiwanese Patent Application No. 10921085040.

Office Action dated Dec. 23, 2021, issued in corresponding German Patent Application No. 10 2019 125 009.9.

Office Action issued Jan. 11, 2024 for Korean Patent Application No. 10-2019-0076528 Note: JP 2017-531393 A was cited in a prior IDS.

Office Action dated Oct. 29, 2020, issued in corresponding Japanese Patent Application No. 2019-168947.

* cited by examiner

DISPLAY APPARATUS

This application is a continuation of U.S. patent application Ser. No. 17/744,603, filed on May 13, 2022, which is a continuation of U.S. patent application Ser. No. 17/235,611, filed on Apr. 20, 2021, which is a continuation of U.S. patent application Ser. No. 16/574,605, filed on Sep. 18, 2019, which claims the benefit of the Korean Patent Application No. 10-2018-0111570 filed on Sep. 18, 2018 and Korean Patent Application No. 10-2019-0076528 filed on Jun. 26, 2019, all of which are hereby incorporated by reference.

BACKGROUND

Technical Field

The present disclosure relates to a display apparatus.

Discussion of the Related Art

With the advancement of an information-oriented society, various requirements for the display field to express information in accordance with an electric information signal have increased, and thus, research is being conducted on various display apparatuses that are thin, light, and low in power consumption. For example, the display apparatuses are categorized into a liquid crystal display (LCD) apparatus, a field emission display (FED) apparatus, an organic light emitting display (OLED) apparatus, etc.

Generally, a display apparatus displays an image on a display panel, and an additional speaker for supplying sound has to be provided. If the speaker is provided in the display apparatus, sound generated in the speaker advances toward a lateral end of the display panel, or upper and lower ends of the display panel instead of a front or rear portion of the display panel on which an image is displayed. Thus, sound is not projected toward a user who watches the image displayed on the display panel in front of the display panel so that it disrupts a user's immersion.

If providing the speaker included in a set apparatus, such as television, the speaker occupies space so that it may impose a restriction on design and spatial disposition of the set apparatus. To overcome these problems, a display apparatus outputs sound to a front direction of the display panel through a vibration of the display panel. However, such displays have difficulties in outputting in a low-pitched sound band. For example, if the low-pitched sound band is output by vibrating the display panel, it might cause an unstable image shake due to severe vibration of the display panel may be caused. Also, because a vibration generating device for outputting the low-pitched sound band generates lots of heat, the lifespan of the display panel may be reduced. To overcome this problem, it is necessary to develop a display apparatus capable of preventing the vibration of the display panel and the heat transmission for the process of outputting the low-pitched sound band.

SUMMARY

Accordingly, embodiments of the present disclosure are directed to a display apparatus that substantially obviates one or more of the problems due to limitations and disadvantages of the related art.

An aspect of the present disclosure is to provide a display apparatus that facilitates to output sound to front and rear directions of a display panel at the same time.

Another object of the present disclosure is to provide a display apparatus that facilitates to output sound with a wide low-pitched sound band and a high sound pressure.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus, comprises a display panel configured to display an image; a sound generating device on a rear surface of the display panel; a rear cover on the rear surface of the display panel and configured to support the sound generating device; a partition member between the rear surface of the display panel and the rear cover and configured to divide the display panel into first area, second area, third area, fourth area and fifth area; and a first sound generating device, a second sound generating device, a third sound generating device, a fourth sound generating device, and a fifth sound generating device attached to the rear surface of the display panel and configured to vibrate the display panel, wherein the first sound generating device, the second sound generating device, the third sound generating device, the fourth sound generating device, and the fifth sound generating device are in the first area, the second area, the third area, the fourth area and the fifth area, respectively.

In another aspect, a display apparatus comprises a display panel configured to display an image; a sound generating device on a rear surface of the display panel; a rear cover on the rear surface of the display panel and configured to support the sound generating device; and a partition member between the rear surface of the display panel and the rear cover and configured to divide the display panel into a first area, a second area, a third area, a fourth area and a fifth area, wherein the sound generating device includes: a first sound generating module attached to the rear surface of the display panel; a second sound generating module spaced apart from the rear surface of the display panel; and a frame configured to accommodate the first sound generating module and the second sound generating module.

Details of other embodiments are included in the detailed description and the drawings.

In the display apparatus according to example embodiments of the present disclosure, sound may be generated in a manner that a traveling direction of the middle-pitched sound (400 Hz or more than 400 Hz) and high-pitched sound (20 kHz or less than 20 kHz), which has strong directivity, is a direction toward the front surface of the display panel, and a traveling direction of the low-pitched sound (200 Hz or less than 200 Hz), which has weak directivity, may be a direction toward the rear surface of the display panel. Thus, a position of generating the sound matches up with the image displayed on the display device, thereby enhancing an immersion of a user who watches the image of the display apparatus.

Moreover, in the display apparatus according to example embodiments of the present disclosure, there is no need for the additional speaker, thereby improving a degree of design freedom of the set apparatus and arrangement of the speaker.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings:

FIGS. 13A to 131 illustrate other embodiments of a sound generating device and a partition member in a display apparatus according to the present disclosure;

DETAILED DESCRIPTION

Figure 1:
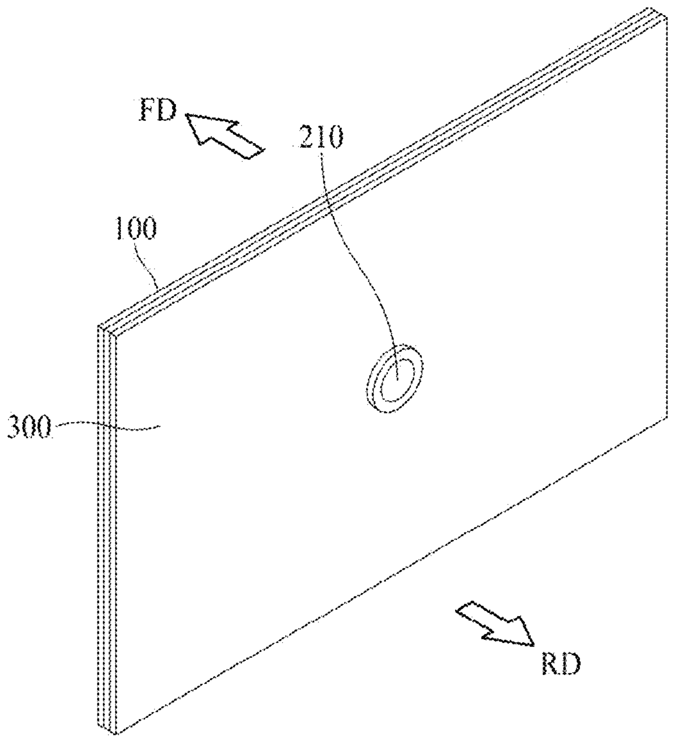
FIG. 1 is a perspective view illustrating a display apparatus according to one embodiment of the present disclosure.

Reference will now be made in detail to embodiments of the present disclosure, examples of which may be illustrated in the accompanying drawings. In the following description, a detailed description of functions or configurations related to this document that are well-known to those skilled in the art may be omitted. The progression of processing steps and/or operations described is an example. The sequence of steps and/or operations is not limited to that set forth herein and may be changed as is known in the art or apparent to those skilled in the art, with the exception of steps and/or operations necessarily occurring in a particular order. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms like "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

In description of the present invention, the terms "first", "second", "A", "B", "(a)", "(b)", and etc. may be used herein to describe various elements. These terms are only used to distinguish one element from another. That is, the essence, order, sequence, or number of the corresponding elements is not limited by these terms. In description of embodiments of the present invention, when one structure is described as being "connected", "combined", or "contact" with another structure, this description should be construed as including a case where the structures contact each other and moreover, a case where a third structure is disposed therebetween.

In description of embodiments of the present invention, the display apparatus may include a liquid crystal device module (LCM) including a display panel and a driver for driving the display panel, and an organic light emitting display (OLED) module. In addition, the display apparatus according to the present invention may also include equipment displays including complete product or final product of LCM or OLED module, for example, notebook computer, television, computer monitor, automotive display, or vehicle display, and set electronic devices or set device (set apparatus) such as mobile electronic devices of smart phone or electronic pad.

Accordingly, the display apparatus according to the present invention may include application products or set apparatuses such as final products including the LCM and OLED modules as well as display apparatuses such as LCM and OLED modules.

If needed, the LCM and OLED modules provided with the display panel and the driver may be expressed as the display apparatus, and the electronic device of the final product including the LCM and OLED modules may be expressed as the set apparatus. For example, in case of the display apparatus such as the LCM and OLED modules, it may include a display panel, and a source printed circuit board (source PCB) corresponding to a controller for driving the display panel. Meanwhile, in case of the set apparatus, it may further include a set PCB corresponding to a set controller, which is connected with the source PCB, so as to control the entire set apparatus.

The display panel used for the embodiment of the present invention may be all types of display panel, for example, a liquid crystal display panel, an organic light emitting diode display panel, a quantum dot (QD) display panel, an electroluminescent display panel, and etc., but not limited to these types. A flexible substrate and a back play support structure for the organic light emitting diode display panel are not limited to a specific display panel enabling a bezel bending. Also, the display panel used for the display apparatus according the embodiment of the present invention is not limited in its shape and size.

Hereinafter, embodiments of the present disclosure will be described in detail with reference to the accompanying drawings.

FIG. 1 is a perspective view illustrating a display apparatus according to one embodiment of the present disclosure. The display apparatus according to one embodiment of the present disclosure includes a display panel 100 configured to display an image, a sound generating device 210 disposed in a rear surface of the display panel 100, and a rear cover 300 disposed in the rear surface of the display panel 100 and configured to support the display panel 100, wherein the sound generating device 210 includes a first sound generating module attached to the rear surface of the display panel 100, and a second sound generating module disposed while being apart from the rear surface of the display panel 100.

The display panel 100 is configured to display an image, and the display panel 100 may be embodied in any type of display panel, such as a liquid crystal display panel, an organic light emitting diode (OLED) display panel, an electroluminescent display panel, etc. The display panel 100 vibrates in accordance with a vibration of the sound generating device, and then outputs sound.

In one embodiment of the present disclosure, according to a structure of a pixel array layer including an anode electrode, a cathode electrode and an organic compound layer, the display panel 100 may display an image in the manner of top emission, bottom emission or dual emission. In the top emission, an image is displayed by emitting visible rays, generated in the pixel array layer, to a front direction of a base substrate. In the bottom emission, an image is displayed by emitting visible rays, generated in the pixel array layer, to a rear direction of a base substrate.

The rear cover 300 is disposed in the rear surface of the display panel 100, and the rear cover 300 supports the display panel 100. For example, the rear cover 300 is disposed while being apart from the display panel 100, and the rear cover 300 may support the sound generating device disposed of therein.

The rear cover 300 is configured to cover the entire rear surface of the display panel 100 while being apart from the rear surface of the display panel 100, and the rear cover 300 may have a flat plate shape of a glass material, a metal material, or a plastic material. In this case, an edge or sharp corner portion of the rear cover 300 may have a sloped surface or curved surface shape by a chamfering process or a corner rounding process. According to one embodiment of the present disclosure, the rear cover 300 of the glass material may be formed of sapphire glass or other suitable material. For example, the rear cover 300 of the metal material may be formed of any one among aluminum, aluminum alloy, magnesium alloy, and an alloy of iron and nickel. According to another embodiment of the present disclosure, the rear cover 300 is relatively thinner than each of a metal plate and a glass plate, and the rear cover 300 may have a stacking structure of the glass plate confronting the rear surface of the display panel 100. In this case, the rear surface of the display apparatus may be used as a mirror surface by the glass plate.

Figure 2:
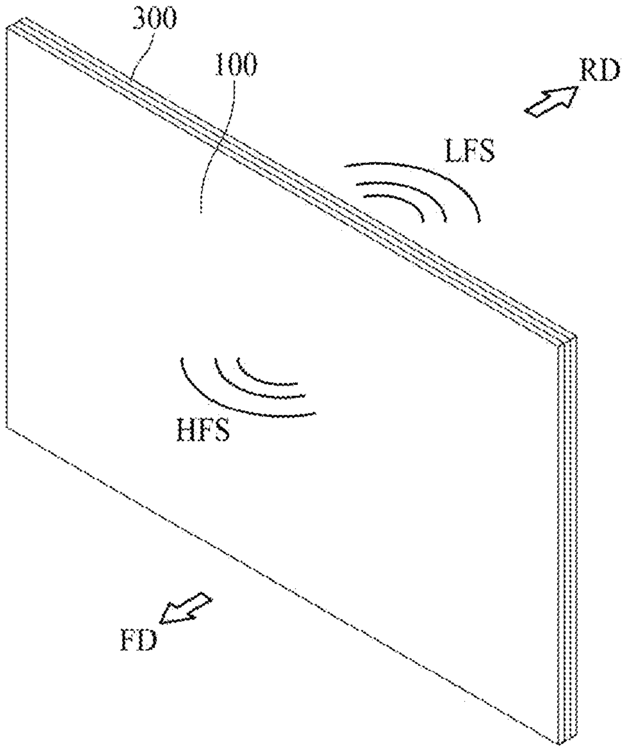
FIG. 2 illustrates sound output of the display apparatus according to one embodiment of the present disclosure.

FIG. 2 illustrates sound output of the display apparatus according to one embodiment of the present disclosure. The first sound generating module is in contact with the rear surface of the display panel 100 so that it is possible to directly vibrate the display panel 100. Thus, because the sound generating device 210 including the first sound generating module uses the display panel 100 as the vibration plate of the sound generating device, the sound is output to a front direction (FD) of the display panel 100 instead of a rear direction (RD) or lower direction of the display panel 100, whereby a position of generating the sound matches up with the image displayed on the display apparatus, thereby enhancing an immersion of a user who watches the image of the display apparatus. The first sound generating module may generate high-pitched sound band.

The first sound generating module may output the sound by vibrating the display panel 100 in accordance with a sound generating current applied based on Fleming's left-hand rule. According to one embodiment of the present disclosure, the first sound generating module includes a first magnet 211*a*, a first plate 212*a*, a first exciter 213*a*, a bobbin ring 214*a* and a first damper 215*a*.

The second sound generating module may be disposed while being apart from the rear surface of the display panel 100. The second sound generating module may generate the sound by vibrating the display panel and the air layer of the sound generating device through the use of vibration plate, and may output the sound to the front direction (FD) of the vibration plate and the rear direction (RD) of the vibration plate. The second sound generating module may generate the low-pitched sound (LFS) band. According to one embodiment of the present disclosure, the second sound generating module may be a woofer, which is not limited to these terms.

Figure 3:
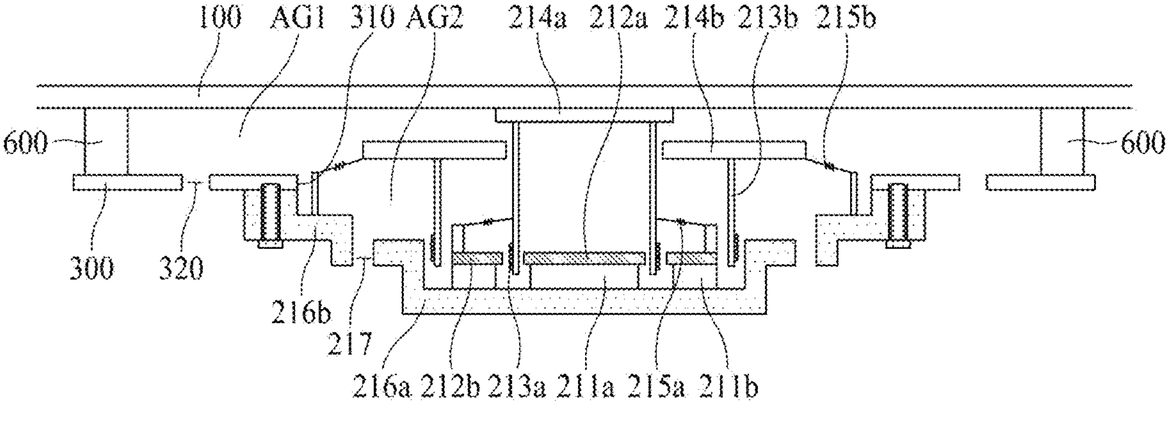
FIG. 3 is a cross-sectional view illustrating the display apparatus according to one embodiment of the present disclosure.

FIG. 3 is a cross-sectional view illustrating the display apparatus according to one embodiment of the present disclosure. The rear cover 300 may include a first hole 310 in which the sound generating device is capable of being mounted, and a second hole 320 capable of discharging front sound generated in the second sound generating module.

The rear cover 300 may include a first hole 310 and second hole 320. The sound generating device is capable of being mounted in the first hole 310 of the rear cover 300. The second hole 320 of the rear cover 300 may discharge the sound generated inside the sound generating device. For example, in order to insert the sound generating device into the first hole 310, the first hole 310 may be perforated in a circular or polygonal shape at preset some areas of the rear cover 300 along a thickness direction of the rear cover 300. Accordingly, the sound generating device may be disposed in the rear surface of the display panel 100 through the first hole 310.

According to one embodiment of the present disclosure, the second hole 320 of the rear cover 300 may discharge sound generated inside the sound generating device, for example, sound generated via a vibration plate 214*b* of the second sound generating module. The vibration plate 214*b* of the second sound generating module vibrates a surrounding air layer in the periphery of the vibration plate, and generates sound by the use of vibration, for example, to output sound in a low-pitched sound band. The sound generated by the vibration plate 214*b* of the second sound generating module may be divided into first low-pitched sound which propagates toward an upper portion of the vibration plate 214*b*, and second low-pitched sound which propagates toward a lower portion of the vibration plate 214*b*. In this case, the first low-pitched sound, which propagates toward the upper portion of the vibration plate 214*b*, may propagate through an air gap between the display panel 100 and the rear cover 300, and may be discharged through the second hole 320 of the rear cover 300. The second hole 320 may be provided in various shapes and sizes to enhance low-pitched sound characteristics.

The sound generating device 210 may include the first sound generating module attached to the rear surface of the display panel 100, and the second sound generating module disposed while being apart from the rear surface of the display panel 100. The sound generating device 210 may include a circular sound generating device, an oval sound generating device, or a pair of sound generating devices. The oval shape may include an elliptical shape, a rectangular shape with rounded corners, or a non-circular curved shape having a width different from its height, but not limited to these types. The oval sound generating device may realize more improved sound quality of high-pitched sound band, and may reduce heat generated by the vibration, whereby it has a good heat radiation efficiency.

Figure 4:
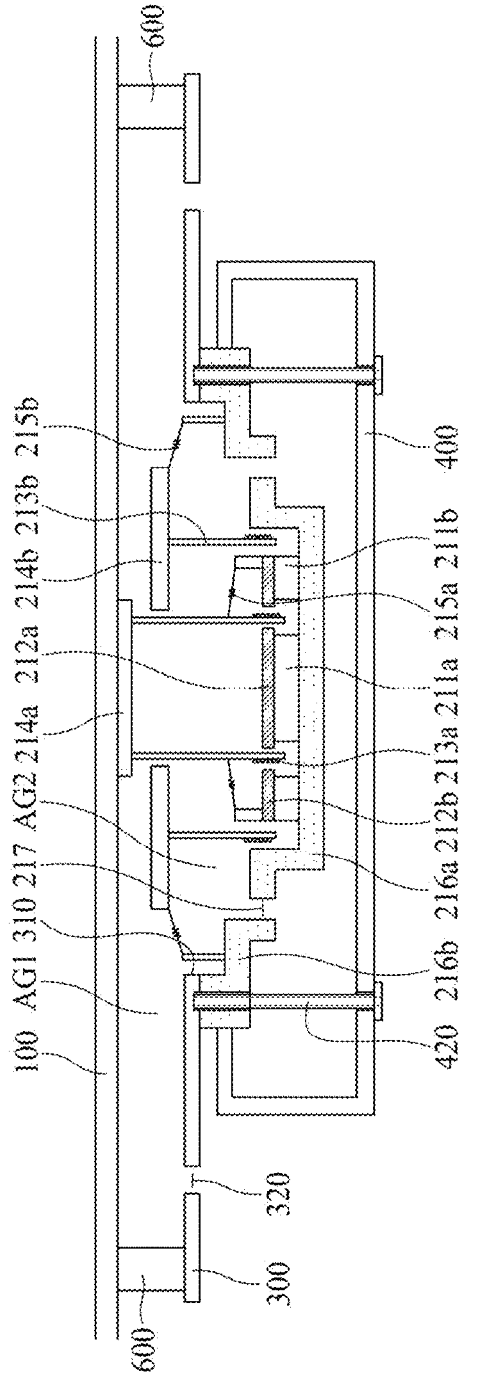
FIG. 4 is a cross-sectional view illustrating a sound generating device according to another embodiment of the present disclosure.
Figure 5:
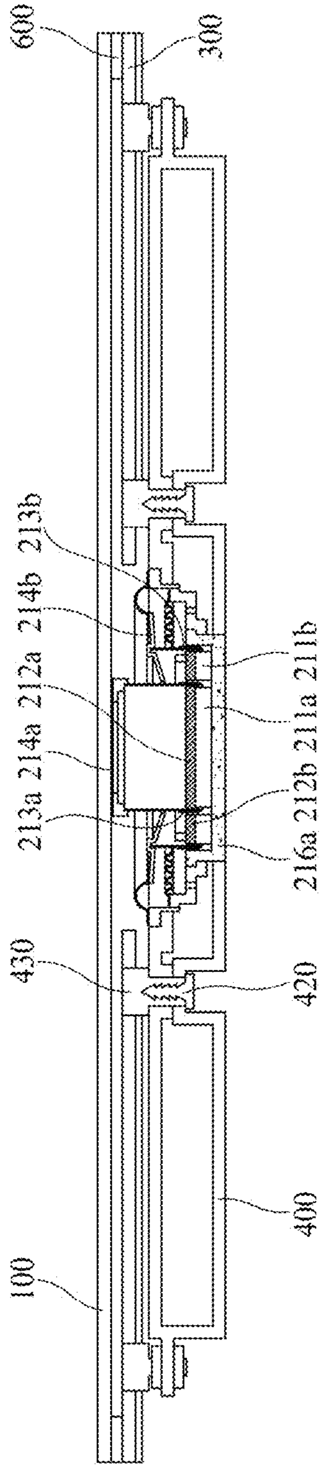
FIG. 5 is a cross-sectional view illustrating a sound generating device according to another embodiment of the present disclosure.
Figure 6A:
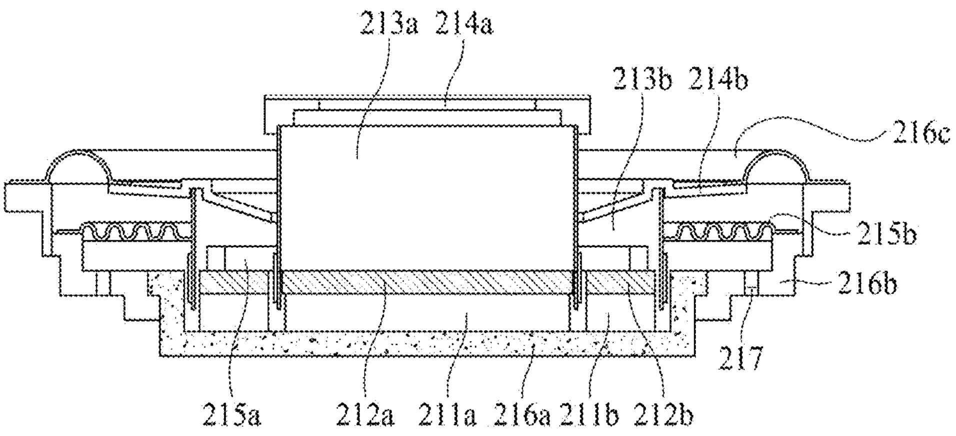
FIGS. 6A to 6D are a detailed cross-sectional view, a front view, a lateral view, and a rear view of a sound generating device.
Figure 6B:
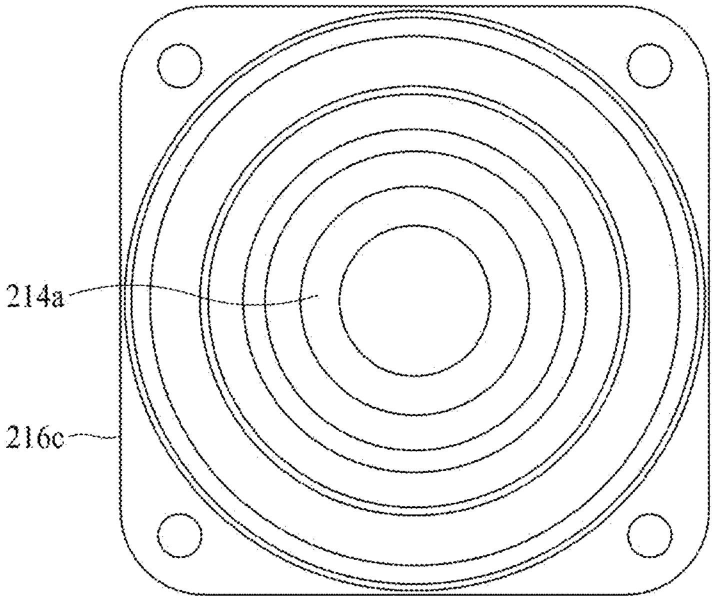
Figure 6C:
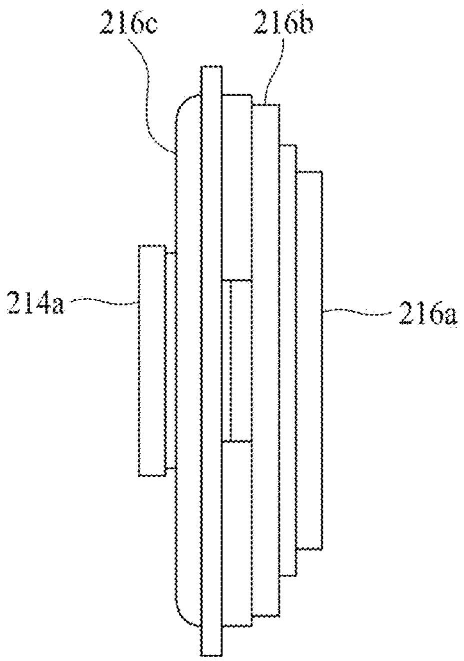
Figure 6D:
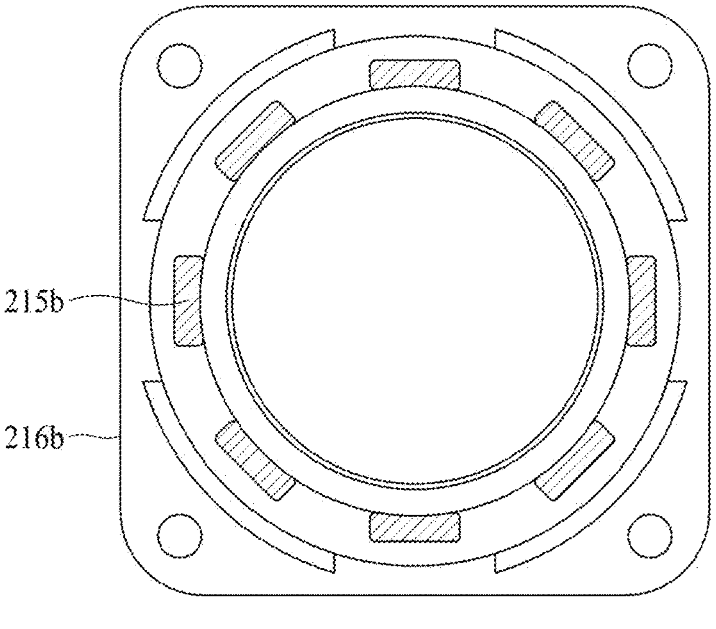

FIGS. 4 and 5 are cross-sectional views illustrating one embodiment of the sound generating device.

With reference to FIGS. 4 and 5, the display apparatus according to one embodiment of the present disclosure may further include at least one speaker box 400 which is arranged in the rear surface of the sound generating device and is configured to amplify sound generated in the sound generating device. An inner space of the speaker box 400 is in communication with a hole 217 formed in a lateral frame 216*b*, so that it is possible to amplify the low-pitched sound band generated in the second sound generating module. The speaker box 400 may be provided to hold 0.1~1 liters (l) of air therein, but not limited to this. Thus, the height of the speaker box 400 is smaller than the height of the sound generating module.

In one embodiment of the present disclosure, the speaker box 400 is arranged in the rear surface of the sound generating device, and may be disposed to surround the rear end part of the sound generating device. In another embodiment of the present invention, the speaker box may be configured to surround the rear end part of the sound generating device and provided in a shape asymmetrically extending toward one side of the sound generating device. A groove portion 420 configured to fix the speaker box 400 to the rear cover 300 is provided in an area adjacent to the sound generating device, and a fixation device may be received in the groove portion 420. Owing to the groove portion 420 disposed in the speaker box 400 and the usage of the fixation device, the speaker box 400 may be stably fixed to the rear cover 300. If needed, the fixation device combined with the groove portion 420 may be removed, and then the sound generating device and the speaker box 400 may be removed and replaced. The speaker box 400 may further include a nut 430 fixed to the rear cover 300, and the groove portion 420 may be fixed to the nut 430 by the use of screw inserted into the fixation device. Thus, a screw through hole is formed inside the nut 430. After the groove portion 420 is aligned with the screw through hole of the nut 430, the fixation device is tightened so that the sound generating device is fixed to the rear cover 300. The nut 430 for fixation may adjust a distance between the sound generating device and the display panel 100. A stable contact between the bobbin ring 214*a* of the first sound generating module and the display panel 100 may be an important factor enabling to output sound to the front direction (FD) by directly vibrating the display panel 100. In this case, if the distance between the bobbin ring 214*a* and the display panel 100 is too long, the sound is not properly generated. Meanwhile, if the distance between the bobbin ring 214*a* and the display panel 100 is too short, the first damper 215*a* of the first sound generating module may be damaged. The size of the sound generating device and the distance adjustment between the display panel 100 and the sound generating device may be controlled by adjusting the height of the nut 430. The fixation device may be the screw or the like, but not limited to this type.

FIGS. 6A to 6D are a detailed cross-sectional view, a front view, a lateral view, and a rear view of a sound generating device. The second sound generating module vibrates the vibration plate in accordance with a sound generating current applied based on Fleming's left-hand rule. According to one embodiment of the present disclosure, the second sound generating module includes a second magnet 211*b*, a second plate 212*b*, a second exciter 213*b*, a vibration plate 214*b*, and a second damper 215*b*.

Also, the sound generating device further includes a frame capable of accommodating the first sound generating module and the second sound generating module. According to one embodiment of the present disclosure, the frame is capable of defining an outer circumferential surface of the sound generating device, and accommodating the first sound generating module and the second sound generating module.

The frame may include a lower frame 216*a* configured to support a lower end of the first sound generating module and a lower end of the second sound generating module, a lateral frame 216*b* coupled to the lower frame 216*a* and configured to include at least one hole 217, and an upper frame 216*c* coupled to the lateral frame 216*b* and configured to cover an upper portion of the first sound generating module and an upper portion of the second sound generating module.

The first magnet 211*a* may be disposed on the lower frame 216*a*. Here, the first magnet 211*a* may be interposed between the first plate 212*a* and the lower frame 216*a*. The lower frame 216*a* and the first plate 212*a* may control a magnetic flux generated in the first magnet 211*a*. Thus, because the first magnet 211*a* is surrounded by the lower frame 216*a* and the first plate 212*a*, the magnetic flux generated in the first magnet 211*a* is concentrated into the first exciter 213*a*, whereby a magnetic flux leakage may be restricted.

The first plate 212*a* may be disposed in an upper end of the first magnet 211*a*, and may be spaced apart from the bobbin ring 214*a*. By inserting the first magnet 211*a* and the first plate 212*a* into the inside of the first exciter 213*a* having the cylinder shape, outer circumferential surfaces of the first magnet 211*a* and the first plate 212*a* are surrounded by the first exciter 213*a*. Thus, the first magnet 211*a* and the first plate 212*a* guide a straight-line reciprocating motion of the first exciter 213*a*. In this case, the first plate 212*a* may be expressed as a center pole or pole pieces. According to one embodiment of the present disclosure, the first plate 212*a* is formed of a material having a magnetic force, for example, iron (Fe) so that it is possible to increase a magnetic flux density formed by the first magnet 211*a*.

The first exciter 213*a* surrounds the first plate 212*a*, and is attached to a rear surface of the bobbin ring 214*a*. For example, the first exciter 213*a* surrounds the first magnet 211*a* and the first plate 212*a*. For example, when a magnetic field is formed inside the first sound generating module by applying a sound generating current to a coil wound on an outer circumferential surface of the first exciter 213*a*, the first exciter 213*a* may vibrate the display panel 100 by means of the bobbin ring 214*a* by the magnetic field. Thus, because a front surface of the first exciter 213*a* is in contact with the bobbin ring 214*a*, the first exciter 213*a* may vibrate the display panel 100 through the bobbin ring 214*a* according to whether or not the current is applied to the first exciter 213*a*. The display panel 100 receives the vibration of the bobbin ring 214*a* and generates middle-pitched sound band and high-pitched sound band through the vibration of the bobbin ring 214*a*, and the high-pitched sound band may be output to the front direction (FD) of the display panel 100. In this case, the first exciter 213*a* may be formed of a magnetic flux penetrable material having a low thermal conductivity. For example, the first exciter 213*a* may be a cylinder structure of a pulp or paper material, aluminum, magnesium, an alloy of aluminum and magnesium, synthetic resin such as polypropylene or polyamide-based fiber.

Also, the first exciter 213*a* may further include the coil wound on the outer circumferential surface of the first exciter 213*a*, and the first exciter 213*a* may be supplied with the sound generating current through the coil. Herein, the coil may be expressed as a voice coil. If the sound generating current is applied to the coil, the first exciter 213*a* may be vibrated while being guided by the first damper 215*a* in accordance with Fleming's left-hand rule based on an applied magnetic field around the coil and an outer magnetic field around the first magnet 211*a*. For example, a magnetic flux generated by the magnetic field may flow along a closed loop in which the coil, the lower frame 216*a*, the first magnet 211*a*, and the first plate 212*a* are sequentially connected with each other, and the first plate 212*a* corresponding to the endpoint is again connected with the coil corresponding to the start point. Thus, because the first exciter 213*a* is vibrated while being guided by the first damper 215*a*, the first exciter 213*a* transmits the vibration to the display panel 100.

The bobbin ring 214*a* may be interposed between the first exciter 213*a* and the display panel 100 so that it is possible to transmit the vibration of the first exciter 213*a* to the display panel 100. Moreover, the bobbin ring 214*a* makes the first exciter 213*a* be attached to the rear surface of the display panel 100. For example, the bobbin ring 214*a* may be embodied in double-sided tape, but not limited to this type. Also, the bobbin ring 214*a* prevents heat generated in the first exciter 213*a* from being transferred to the display panel 100, and efficiently transmits the vibration of the first exciter 213*a* to the display panel 100.

The first damper 215*a* is disposed between the first exciter 213*a* and the second plate 212*b* so that it is possible to guide the vibration of the first exciter 213*a* and the vibration of the bobbin ring 214*a*. The first damper 215*a* is provided such that it has a wrinkled structure between its one end and the other end, whereby it is possible to control and guide the vibration of the bobbin ring 214*a* by contraction and relaxation movements in accordance with the vibration of the bobbin ring 214*a*. Thus, because the first damper 215*a* is connected between the first exciter 213*a* and the second plate 212*b*, a vibration distance of the bobbin ring 214*a* can be restricted by a restoring force. For example, if the bobbin ring 214*a* vibrates to be more or less than a predetermined distance, the bobbin ring 214*a* may be restored to its original position by the restoring force of the first damper 215*a*. The first damper 215*a* may be known by other terms, such as a spider, a suspension or an edge.

According to one embodiment of the present disclosure, the first sound generating module may be an actuator, transducer or exciter, but not limited to these types. For example, the first sound generating module may be any sound devices capable of outputting sound in accordance with an electrical signal.

The second magnet 211*b* may be disposed on the lower frame 216*a*. Here, the second magnet 211*b* may be interposed between the second plate 212*b* and the lower frame 216*a*. The lower frame 216*a* and the second plate 212*b* control a magnetic flux generated in the second magnet 211*b*. Thus, because the second magnet 211*b* is surrounded by the lower frame 216*a* and the second plate 212*b*, the magnetic flux generated in the second magnet 211*b* is concentrated into the second exciter 213*b*, whereby a magnetic flux leakage may be restricted.

According to one embodiment of the present disclosure, the second magnet 211*b* may have a ring shape having a hollow (e.g., a space defined in a central area of the ring shape) therein. In the hollow of the second magnet 211*b*, the first plate of the first sound generating module may be disposed away from the second magnet 211*b*.

The second plate 212*b* may be disposed in an upper end of the second magnet 211*b*, and may be spaced apart from the vibration plate 214*b*. Because the second magnet 211*b* and the second plate 212*b* are inserted into the inside of the second exciter 213*b* having the cylinder shape, outer circumferential surfaces of the second magnet 211*b* and the second plate 212*b* are surrounded by the second exciter 213*b*. Thus, the second magnet 211*b* and the second plate 212*b* guide a straight-line reciprocating motion of the second exciter 213*b*. In this case, the second plate 212*b* may be expressed as a center pole or pole pieces. According to one embodiment of the present disclosure, the second plate 212*b* is formed of a material having a magnetic force, for example, iron (Fe), so that a magnetic flux density formed by the second magnet 211*b* can be increased.

According to one embodiment of the present disclosure, the second plate 212*b* may have a ring shape having a hollow therein. In the hollow of the second plate 212*b*, the first plate of the first sound generating module may be disposed away from the second plate 212*b*.

The second exciter 213*b* surrounds the second plate 212*b*, and is attached to a rear surface of the vibration plate 214*b*. Here, the second exciter 213*b* surrounds the second magnet 211*b* and the second plate 212*b*. For example, when a magnetic field is formed inside the second sound generating module by applying a sound generating current to a coil wound on an outer circumferential surface of the second exciter 213*b*, the second exciter 213*b* may vibrate a surrounding air layer or air gap in the periphery of the vibration plate by means of the vibration plate 214*b* by the magnetic field, and may output the sound. Thus, because a front surface of the second exciter 213*b* is in contact with the vibration plate 214*b*, the second exciter 213*b* may vibrate the vibration plate 214*b* according to whether or not the current is applied to the second exciter 213*b*. In this case, the second exciter 213*b* may be formed of a magnetic flux penetrable material having a low thermal conductivity. For example, the second exciter 213*b* may be a cylinder structure of a pulp or paper material, aluminum, magnesium, an alloy of aluminum and magnesium, synthetic resin such as polypropylene or polyamide-based fiber.

According to one embodiment of the present disclosure, the second exciter 213*b* may be a cylinder shape having a hollow therein. In the hollow of the second exciter 213*b*, the first exciter 213*a* of the first sound generating module may be disposed away from the second exciter 213*b*.

Also, the second exciter 213*b* may further include a coil wound on an outer circumferential surface of the second exciter 213*b*, and the second exciter 213*b* may be supplied with the sound generating current through the coil. Herein, the coil may be expressed as a voice coil. If the sound generating current is applied to the coil, the second exciter 213*b* may be vibrated while being guided by the second damper 215*b* in accordance with Fleming's left-hand rule based on an applied magnetic field around the coil and an outer magnetic field around the second magnet 211*b*. For example, a magnetic flux generated by the magnetic field may flow along a closed loop in which the coil, the lower frame 216*b*, the second magnet 211*b*, and the second plate 212*b* are sequentially connected with each other, and the second plate 212*b* is connected with the coil again. Thus, because the second exciter 213*b* is vibrated while being guided by the second damper 215*b*, the second exciter 213*b* transmits the vibration to the display panel 100.

The vibration plate 214*b* may be arranged in parallel with the rear surface of the display panel 100 while being spaced apart from the rear surface of the display panel 100, but not limited to this structure. The vibration plate 214*b* may be formed in various shapes, for example, a cone shape. The vibration plate 214*b* may propagate the vibration of the second exciter 213*b* through a first air gap (AG1) and a second air gap (AG2), and may output the sound to the rear portion of the display panel 100. Because the vibration plate 214*b* is spaced apart from the rear surface of the display panel 100, heat generated in the bobbin 213*b* can be prevented from being transferred to the display panel 100.

According to one embodiment of the present disclosure, low-pitched sound(LFS) band may be generated by vibrating the first air gap (AG1) positioned in the rear surface of the display panel, and the second air gap (AG2) positioned in the sound generating device through the vibration of the vibration plate 214*b* of the second sound generating module, sound generated in the first air gap (AG1) may be discharged through the second hole 320 to the rear direction (RD) of the display panel, and sound generated in the second air gap (AG2) may be discharged through the hole 217 of the lower frame to the rear direction (RD) of the display panel.

According to one embodiment of the present disclosure, the vibration plate 214*b* may be provided in a shape with a central hollow in the central part. In the central hollow of the vibration plate 214*b*, the bobbin ring 214*a* of the first sound generating module may be disposed while being spaced apart from the vibration plate 214*b*.

Because the second damper 215*b* is between the second exciter 213*b* and the lateral frame 216*b*, the second damper 215*b* guides the vibration of the second exciter 213*b* and the vibration of the vibration plate 214*b*. The second damper 215*b* is provided such that it has a wrinkled structure between its one end and the other end, whereby it is possible to control and guide the vibration of the vibration plate 214*b* by contraction and relaxation movements in accordance with the vibration of the vibration plate 214*b*. Thus, because the second damper 215*b* is connected between the second exciter 213*b* and the lateral frame 216*b*, it is possible to restrict a vibration distance of the vibration plate 214*b* by a restoring force. For example, if the vibration plate 214*b* vibrates to be more or less than a predetermined distance, the vibration plate 214*b* may be restored to its original position by the restoring force of the second damper 215*b*. The second damper 215*b* may be known by other terms, such as a spider, a suspension, or an edge.

According to one embodiment of the present disclosure, the second sound generating module includes a hollow, and the first sound generating module may be disposed in the hollow of the second sound generating module.

The second sound generating module includes a hollow penetrating through a central axis in a vertical direction. The first sound generating module may be disposed in the hollow of the second sound generating module, and the first sound generating module and the second sound generating module may be coupled to each other and formed as one body. The hollow of the second sound generating module may be formed in at least one among the second magnet 211*b*, the second plate 212*b*, the second exciter 213*b*, the vibration plate 214*b* and the second damper 215*b* of the second sound generating module.

According to one embodiment of the present disclosure, a magnetic field of the first magnet 211*a* in the first sound generating module may be opposite to a magnetic field of the second magnet 211*b* in the second sound generating module.

Because the first sound generating module may output sound in the high-pitched sound band to the front direction (FD) of the display panel by directly vibrating the display panel, and the second sound generating module may output sound in the low-pitched sound band to the rear direction (RD) of the display panel by vibrating the first air gap and the second air gap. Thus, the first sound generating module and the second sound generating module have the opposite directional magnetic fields so that independent control of the vibration of the first sound generating module and the vibration of the second sound generating module can be realized.

The lower frame 216*a* may support the first magnet 211*a* of the first sound generating module and the second magnet 211*b* of the second sound generating module. The lower frame 216*a* together with the first plate 212*a* and the second plate 212*b* controls the magnetic flux formed through the first magnet 211*a* and the second magnet 211*b* so that the magnetic flux density flowing in the first exciter 213*a* and the second exciter 213*b* can be increased. Thus, the lower frame 216*a* and the first plate 212*a* are respectively arranged at lower and upper ends of the first magnet 211*a*, and the lower frame 216*a* and the second plate 212*b* may be respectively arranged at lower and upper ends of the second magnet 211*b* to improve the vibration characteristics by increasing the magnetic flux density formed through the first magnet 211*a* and the second magnet 211*b*. The lower frame 216*a* is not limited to these terms, and may be known by other terms, such as a yoke.

The lateral frame 216*b* is coupled to the lower frame 216*a*, and the lateral frame 216*b* may include at least one hole 217 for discharging sound. The lateral frame 216*b* may include a fastening structure to be fastened with the rear structure through the use of fastening means, such as a PEM nut or other self-locking nut.

According to one embodiment of the present disclosure, the hole formed in the lateral frame 216*b* may output the low-pitched sound band, which is generated in the air gap existing inside the sound generating device by the use of vibration plate of the second sound generating module, to the rear direction (RD) of the display panel 100. Also, according to one embodiment of the present disclosure, the lateral frame 216*b* is formed of a conductive material so as to control the magnetic flux generated in the second magnet 211*b*. For example, as the lateral frame 216*b* is surrounded by the second magnet 211*b* while being spaced apart from the second magnet 211*b*, a magnetic flux generated in a magnet member is concentrated into the second exciter 213*b*, whereby a magnetic flux leakage may be restricted. The lateral frame 216*b* is not limited to these terms, and may be expressed by other terms such as a yoke.

The upper frame 216*c* may cover an upper portion of the first sound generating module and an upper portion of the second sound generating module. Also, the first sound generating module may be attached to the rear surface of the display panel, and the upper frame 216*c* is configured to include an opening at the center thereof, in one example.

The second sound generating module may generate low-pitched sound band which is relatively lower than that of the first sound generating module.

According to one embodiment of the present disclosure, the first sound generating module, which is attached to the rear surface of the display panel, vibrates the display panel so that it is possible to output sound to the front direction (FD) of the display panel. Herein, as described above, the display panel is generally formed of a material having a high stiffness such as glass, whereby it has limitations on output of the low-pitched sound band due to the high stiffness. Thus, the first sound generating module may generate the high-pitched sound band.

According to one embodiment of the present disclosure, the second sound generating module is disposed while being spaced apart from the rear surface of the display panel, and the second sound generating module may output sound by vibrating the air layer in the periphery of the vibration plate 214*b* including the upper portion or lower portion of the vibration plate 214*b*. The vibration plate 214*b* of the second sound generating module is not fixed to the display panel, and the vibration plate 214*b* of the second sound generating module may output sound regardless of the stiffness of the display panel. Accordingly, the second sound generating module may generate sound in the low-pitched sound band, which is hardly generated in the first sound generating module.

The first sound generating module may be an actuator, and the second sound generating module may be a woofer.

According to one embodiment of the present disclosure, the first sound generating module may be the actuator or exciter, but not limited to these types. For example, the first sound generating module may be any sound devices capable of outputting sound in accordance with an electrical signal. According to one embodiment of the present disclosure, the second sound generating module may be the woofer, but not limited to these terms. The second sound generating module may be a speaker module capable of generating sound by vibrating the vibration plate.

The second sound generating module includes the vibration plate 214*b* disposed while being spaced apart from the rear surface of the display panel, and the vibration plate 214*b* may be not brought into physical contact with the first sound generating module.

According to one embodiment of the present disclosure, the vibration plate 214*b* of the second sound generating module may output sound by vibrating the air layer in the periphery of the vibration plate 214*b* including the upper portion or lower portion of the vibration plate 214*b*, and the output sound may include the low-pitched sound band. In this case, the first sound generating module, which is attached to the rear surface of the display panel, may vibrate the display panel, and the first sound generating module and the second sound generating module may be vibrated in different vibration modes or different frequencies from each other. Thus, the vibration plate 214*b* of the second sound generating module is not in physical contact with the first sound generating module to avoid interference with the first sound generating module, for example, whereby the second sound generating module may be independently operated without any interference from the vibration of the first sound generating module.

According to one embodiment of the present disclosure, the first sound generating module outputs first-pitch sound band, the second sound generating module outputs second-pitch sound band, and the first-pitch sound band may be high-pitched sound band in comparison to the second-pitch sound band. Accordingly, the first sound generating module and the second sound generating module may be independently operated by receiving different vibration signals, and thus, the display apparatus according to one embodiment of the present disclosure may include a first sound generating module driver and a second sound generating module driver for respectively controlling the first sound generating module and the second sound generating module.

Figure 7A:
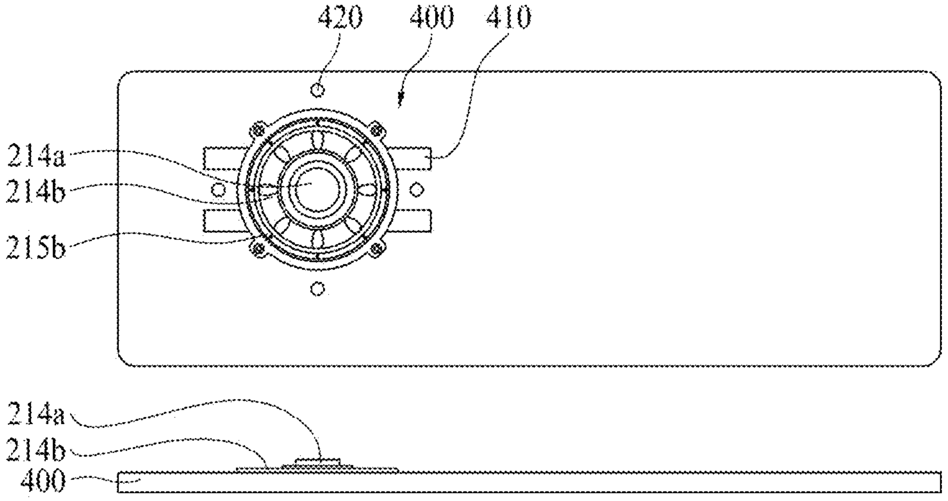
FIG. 7A shows front view and side view of a sound generating device according to one embodiment of the present disclosure.
Figure 7B:
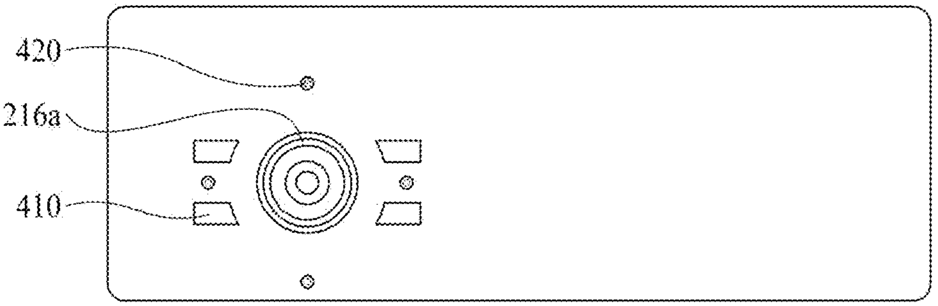
FIG. 7B is a rear view of a dound generating device according to one embodiment of the present disclosure.

FIG. 7A shows front view and side view of a sound generating device according to one embodiment of the present disclosure, and FIG. 7B is a rear view of a sound generating device according to one embodiment of the present disclosure. In the sound generating device detached from the rear cover 300, the bobbin ring 214*a* of the first sound generating module which vibrates in the direct contact with the display panel 100 and outputs the high-pitched sound (HFS) band is disposed in the center of the sound generating device. And, the vibration plate 214*b* and the second damper 215*b* of the second sound generating module which is spaced apart from the display panel 100 and is configured to generate the low-pitched sound (LFS) band is disposed to surround the bobbin ring 214*a* of the first sound generating module. The sound generating device may be modularized in the type being combined with the inner side of the speaker box 400 of the rectangular shape. The shape of the speaker box 400 is not limited to the above specific shape. A ventilating hole 410 may be disposed in the area of the speaker box 400 being adjacent to the sound generating device, wherein the low-pitched sound (LFS) band generated in the second sound generating module is discharged through the ventilating hole 410. The ventilating hole 410 may be formed in various shapes and disposed at various positions in consideration of low-pitched sound (LFS) characteristics. From the lateral view, it is known that the bobbin ring 214*a* and the vibration plate 214*b* upwardly protrude from the surface of the speaker box 400 and are provided to be in contact with the display panel 100. From the rear view, it is known that the lower frame 216*a* of the sound generating device combined with the speaker box 400 is exposed. Also, in the front view, the ventilating hole 410 configured to discharge the low-pitched sound (LFS) band may be disposed in the rear surface of the speaker box 400, and the groove portion 420 may be disposed so as to fix the speaker box 400 to the rear cover 300 of the display panel 100.

Figure 8:
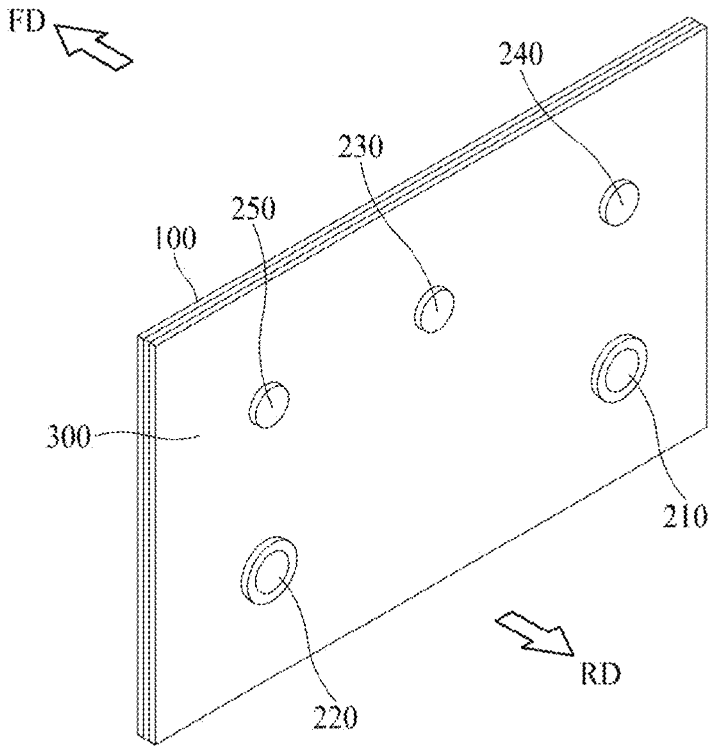
FIG. 8 is a perspective view illustrating a display apparatus according to another embodiment of the present disclosure.
Figure 9:
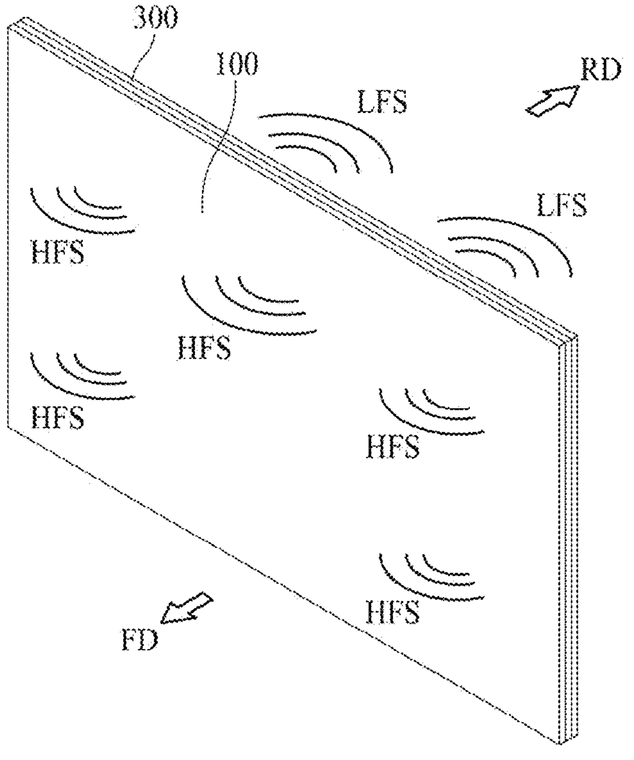
FIG. 9 illustrates sound output of the display apparatus according to another embodiment of the present disclosure.

FIG. 8 is a perspective view illustrating a display apparatus according to another embodiment of the present disclosure. FIG. 9 illustrates sound output of the display apparatus according to another embodiment of the present disclosure.

With reference to FIGS. 8 and 9, the display apparatus according to another embodiment of the present disclosure includes a display panel 100 configured to display an image, a rear structure 300 configured to support a rear surface of the display panel 100, and first to fifth sound generating devices 210, 220, 230, 240, and 250 disposed between the display panel 100 and the rear structure 300. The first and second sound generating devices 210 and 220 respectively include a first sound generating module disposed in a lower area and attached to the rear surface of the display panel 100, and a second sound generating module disposed while being apart from the rear surface of the display panel 100. The third, fourth, and fifth sound generating devices 230, 240, and 250 may be actuators for directly vibrating the display panel 100.

The display apparatus according to another embodiment of the present disclosure may have sound characteristics of 5.1 channels. According to one embodiment of the present disclosure, the display panel 100 according to the present disclosure may output sound in a high-pitched sound band independently controlled in each of the five areas to a front direction of the display panel, and also may output sound in a low-pitched sound band controlled in each of the two areas to a rear direction of the display panel.

FIGS. 10A to 10G are rear views illustrating other embodiments of display apparatus. There is a partition member 600 configured to divide the display panel 100 into a lower right area (LRA), a lower left area (LLA), an upper central area (UCA), an upper right area (URA) and an upper left area (ULA), and first, second, third, fourth and fifth sound generating devices 210, 220, 230, 240 and 250 respectively arranged in the lower right area (LRA), the lower left area (LLA), the upper central area (UCA), the upper right area (URA) and the upper left area (ULA). The partition member 600 may be interposed between the display panel 100 and the rear cover 300. According to one embodiment of the present disclosure, the partition member 600 may surround each of the first sound generating device and the second sound generating device, and the partition member 600 may divide each area provided with each of the first sound generating device 210, the second sound generating device 220, the third sound generating device 230, the fourth sound generating device 240 and the fifth sound generating device 250. Herein, each of the first to fifth sound generating devices independently generates sound in each corresponding area, and the partition member 600 prevents interference between sound generated in the neighboring area and sound generated in the distant area. Accordingly, the partition member 600 may prevent sound interference among sound generated in the lower right area (LRA) of the display panel 100, sound generated in the lower left area (LLA), sound generated in the upper central area (UCA), sound generated in the upper right area (URA), and sound generated in the upper left area (ULA). The partition member 600 may include first to eighth partition members 610, 620, 630, 640, 650, 660, 670 and 680, and the first to eighth partition members 610, 620, 630, 640, 650, 660, 670 and 680 may be formed in the structure of surrounding each of the lower right area (LRA), the lower left area (LLA), the upper central area (UCA), the upper right area (URA) and the upper left area (ULA).

Figure 10A:
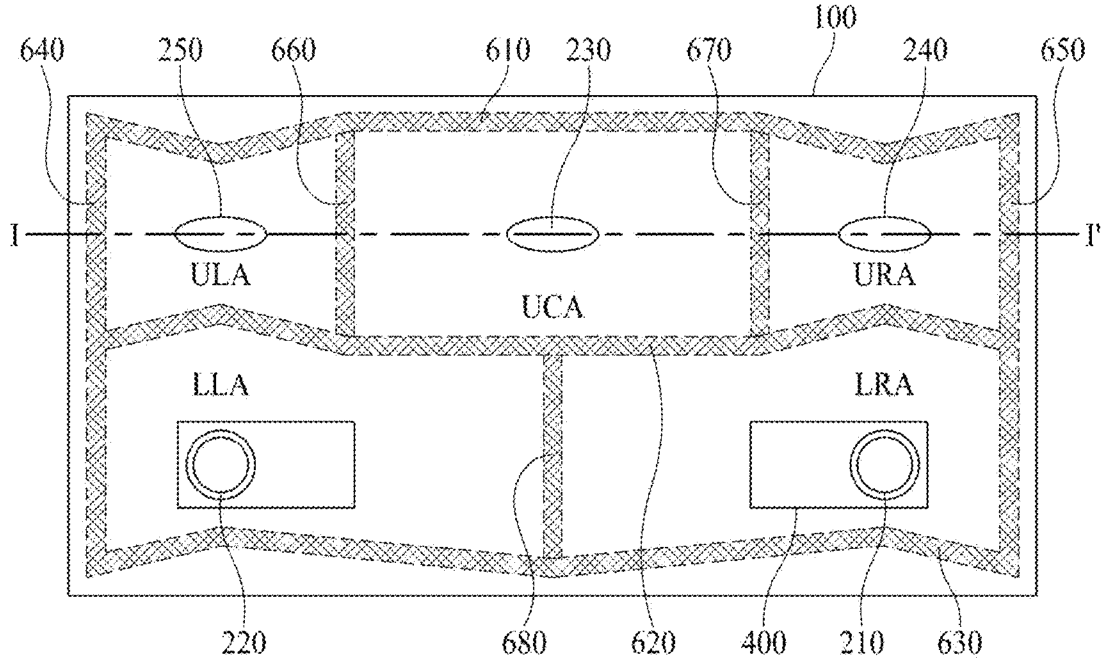
FIGS. 10A to 10G illustrate other embodiments of a sound generating device and a partition member in a display apparatus according to the present disclosure.
Figure 10B:
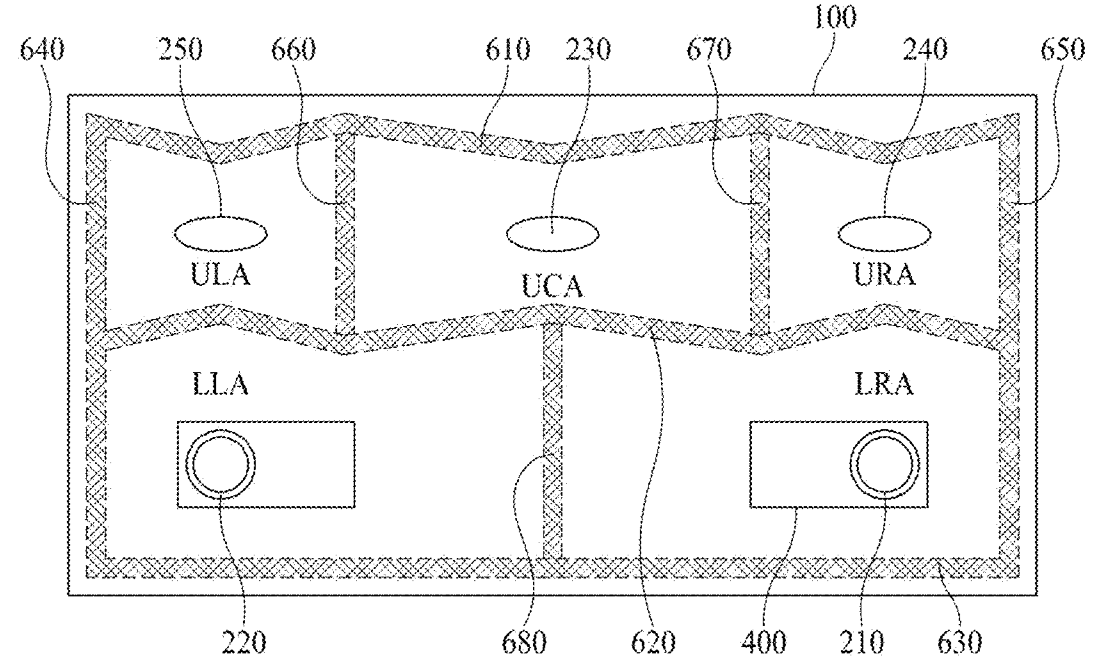
Figure 10C:
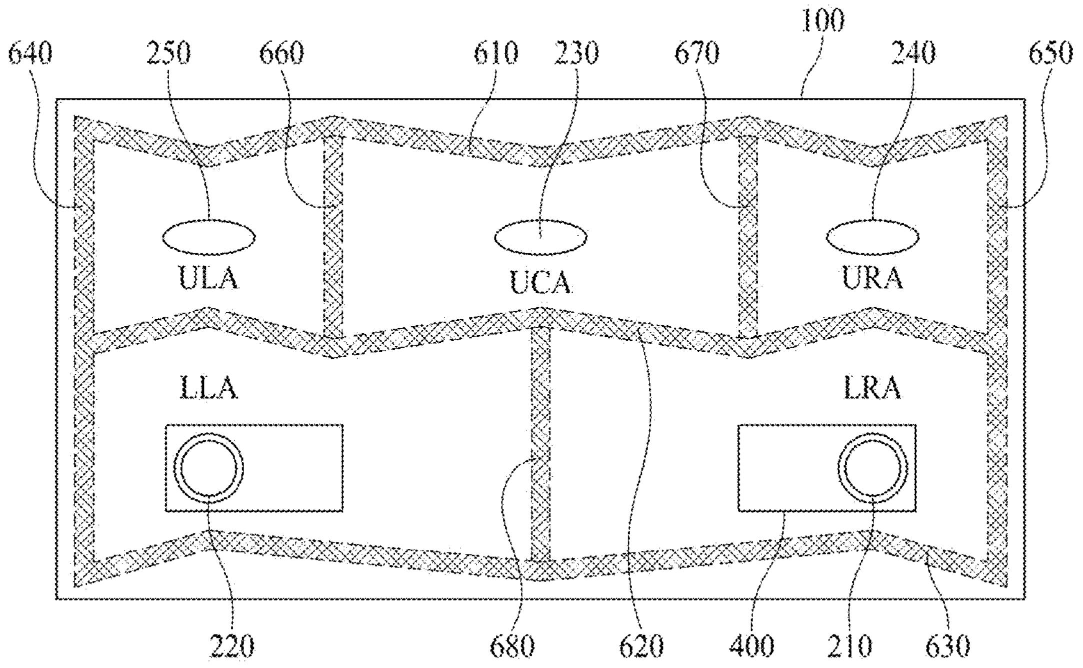
Figure 10D:
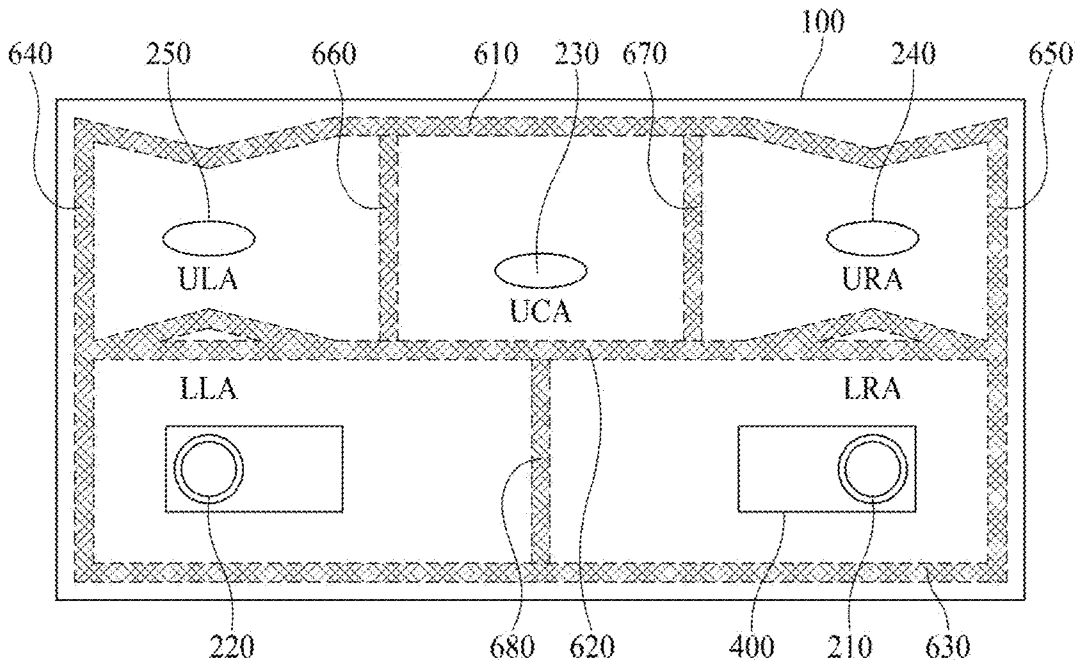
Figure 10E:
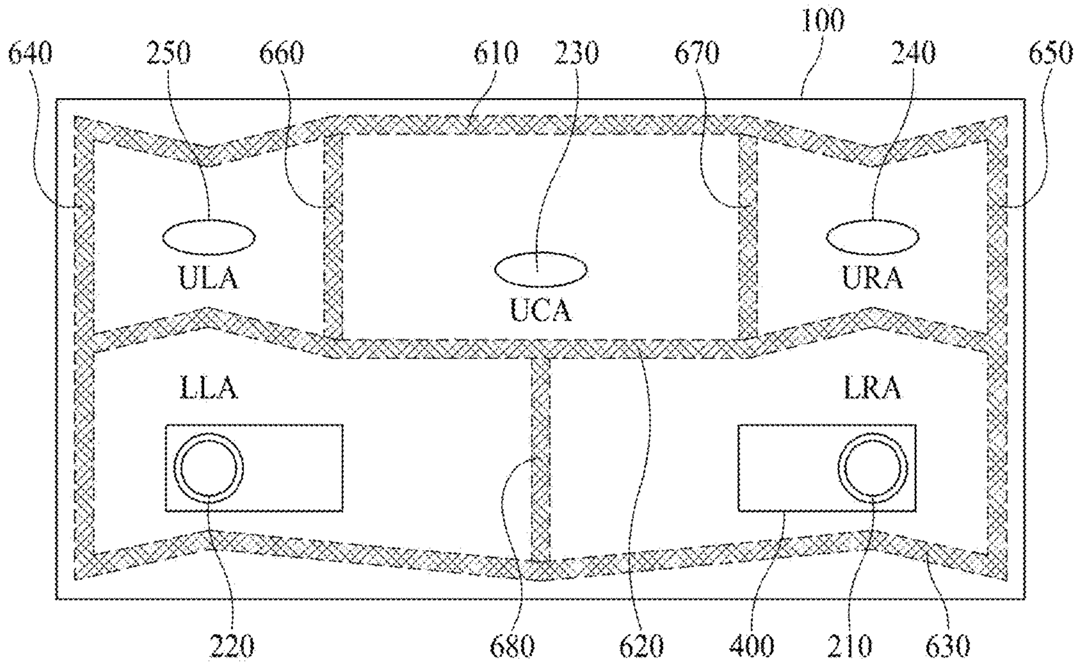
Figure 10F:
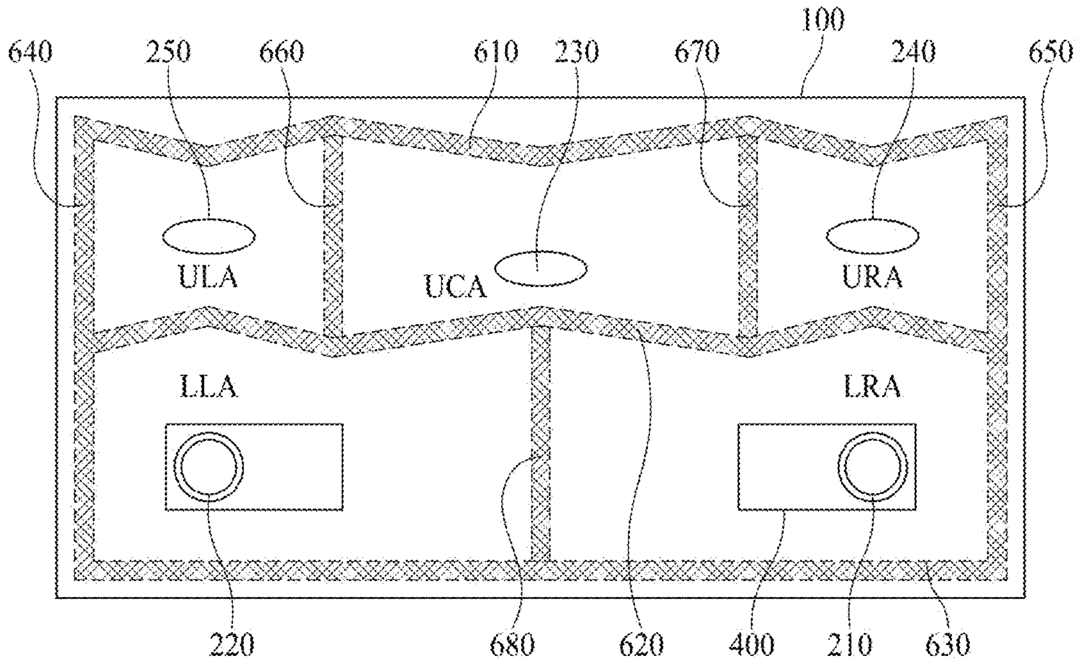
Figure 10G:
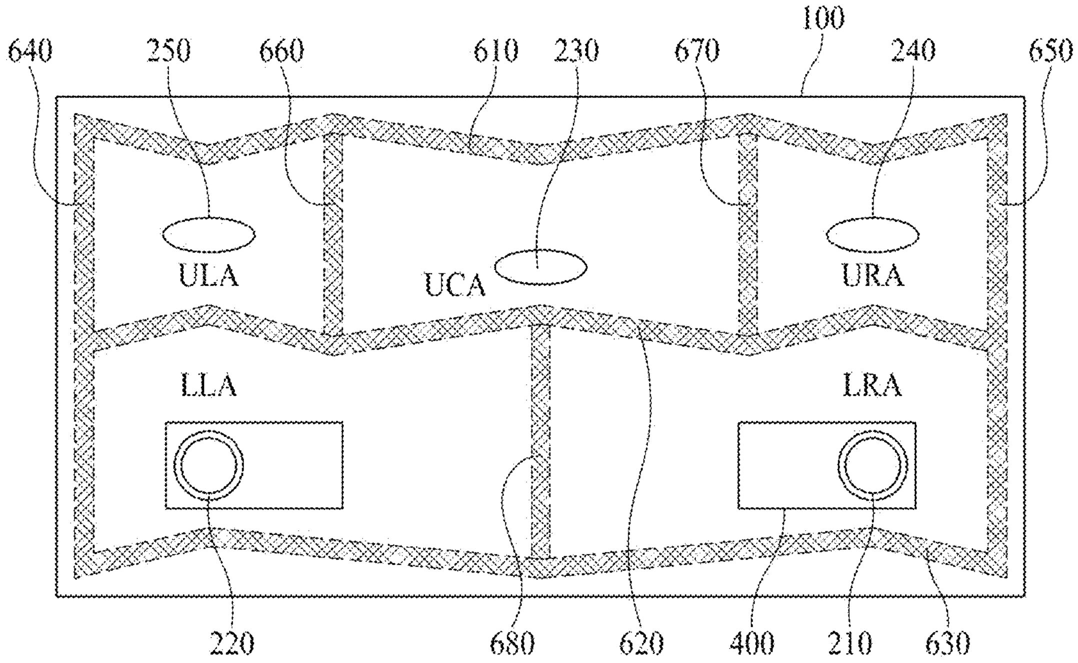

The second partition member 620, the third partition member 630, the fifth partition member 650 and the eighth partition member 680 may define the area of the display panel to which sound generated in the first sound generating device 210 is output, and the second partition member 620, the third partition member 630, the fourth partition member 640 and the eighth partition member 680 may define the area of the display panel to which sound generated in the second sound generating device 220 is output. The first partition member 610, the second partition member 620, the sixth partition member 660 and the seventh partition member 670 may define the area of the display panel to which sound generated in the third sound generating device 230 is output. The first partition member 610, the second partition member 620, the fifth partition member 650 and the seventh partition member 670 may define the area of the display panel to which sound generated in the fourth sound generating device 240 is output. The first partition member 610, the second partition member 620, the fourth partition member 640 and the sixth partition member 660 may define the area of the display panel to which sound generated in the fifth sound generating device 250 is output. The sound wave generated by vibrating the display panel 100 through the use of sound generating device radially progresses from the center of the sound generating device, which is referred to as a progressive wave. If the progressive wave is reflected on one side of the partition member 600, and progresses to an opposite direction, it is referred to as a reflected wave. If this reflected wave is overlapped and interfered with the progressive wave, it is not progressed, and it is in a standing state, which is referred to as a standing wave. The standing wave causes the reduction of sound pressure, thereby to deteriorate the sound output properties. Thus, in order to prevent the reduction of sound pressure by the standing wave generated due to the interference between the progressive wave and the reflected wave, a bent portion is formed in the partition member 600. The standing wave causing the reduction of sound pressure is generated at a point having the large progressive wave and the large reflected wave. Accordingly, the bent portion may be disposed in the point having the largest sound wave approaching from the sound generating device. With reference to FIGS. 10A to 10G, it is shown that the various shaped bent portion is disposed in the first sound generating device 210 to the fifth sound generating device 250. For example, in case of the partition member 600 surrounding the third sound generating device 230, the fourth sound generating device 240 and the fifth sound generating device 250 which generate the high-pitched sound (HFS) band, the bent portion may be vertically disposed so as to be aligned in the center of the sound generating device. Also, in the partition member 600 surrounding the first sound generating device 210 and the second sound generating device 220 which generate the high-pitched sound (HFS) band and the low-pitched sound (LFS) band at the same time, the bent portion may be disposed while being vertically aligned in the center of the sound generating device. For improvement of the sound performance, the plurality of exciters included in the sound generating device may have each thickness above a predetermined value, which may be a factor of disturbing a clean back design in the rear surface of the display panel. An average thickness in the exciter used for the sufficient sound output may be about 16 mm. If the sound generating device using the exciter having the thickness of about 16 mm is disposed in the upper left area (ULA) and the upper right area (URA), the rear exterior surface of the final display product may be uneven by the thickness of the sound generating device. In order to realize the smooth clean back in the rear surface of the final display product, the exciter to be disposed in the upper central area (UCA) and the upper left and right areas (ULA, URA) may have the relatively small thickness. For example, the exciter having about 3 mm thickness may be disposed in each of the upper central area (UCA) and the upper left and right areas (ULA, URA), and at least two exciters may be adjacently disposed so as to compensate for the reduced sound output. Although not shown in FIGS. 10A to 10G, for the clean back design in the rear exterior surface of the final display product, at least two exciters having the small thickness may be disposed in each of the third sound generating device 230, the fourth sound generating device 240 and the fifth sound generating device 250 respectively disposed in the upper central area (UCA), the upper left area (ULA) and the upper right area (URA). With reference to FIGS. 10A to 10C, it is shown that the third sound generating device 230 disposed in the upper central area (UCA) of the rear surface of the display panel 100 is aligned on the same line in the horizontal direction with the fourth sound generating device 240 and the fifth sound generating device 250 respectively disposed in the upper right area (URA) and the upper left area (ULA) adjacent to the upper central area (UCA). However, with reference to FIGS. 10D to 10G, the third sound generating device 230 disposed in the upper central area (UCA) of the rear surface of the display panel 100 is not aligned on the same line in the horizontal direction with the fourth sound generating device 240 and the fifth sound generating device 250, but is apart from a central line. Owing to this arrangement, the progressing direction of sound generated from the fourth and fifth sound generating devices 240 and 250 at both sides of the display panel 100 is different from the progressing direction of sound generated from the third sound generating device 230 in the upper central area (UCA) of the display panel 100. For example, if the third sound generating device 230 disposed in the upper central area (UCA) of the display panel is positioned at a lower portion with respect to an alignment reference line of the fourth and fifth sound generating devices 240 and 250, the sound generated in the fourth and fifth sound generating devices propagates to the left and right directions of the front surface of the display panel 100, and the sound generated in the third sound generating device propagates to the middle and lower directions of the front surface of the display panel 100 by the interaction between the third sound generating device 230 and the fourth and fifth sound generating devices 240 and 250, thereby to realize a surround stereo sound effect.

Figure 11:
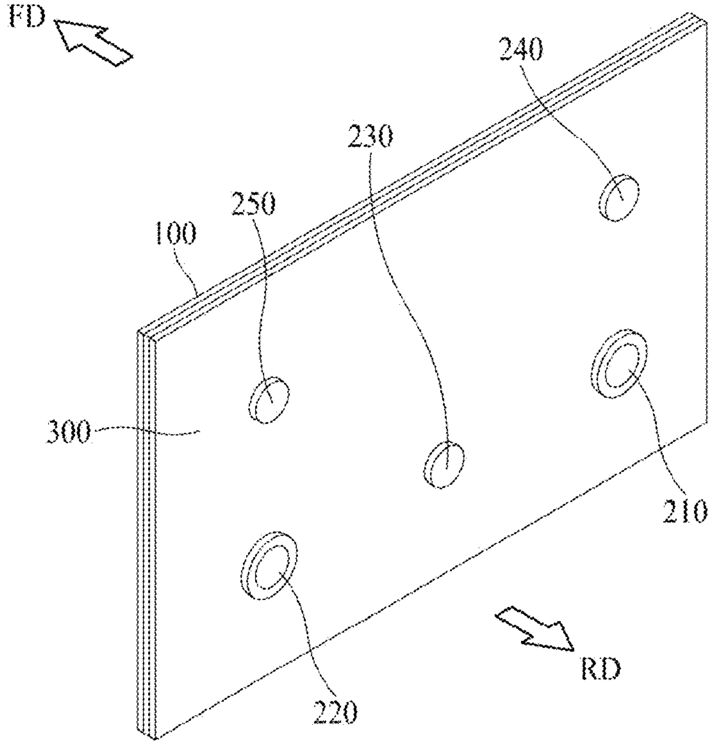
FIG. 11 is a perspective view illustrating a display apparatus according to another embodiment of the present disclosure.
Figure 12:
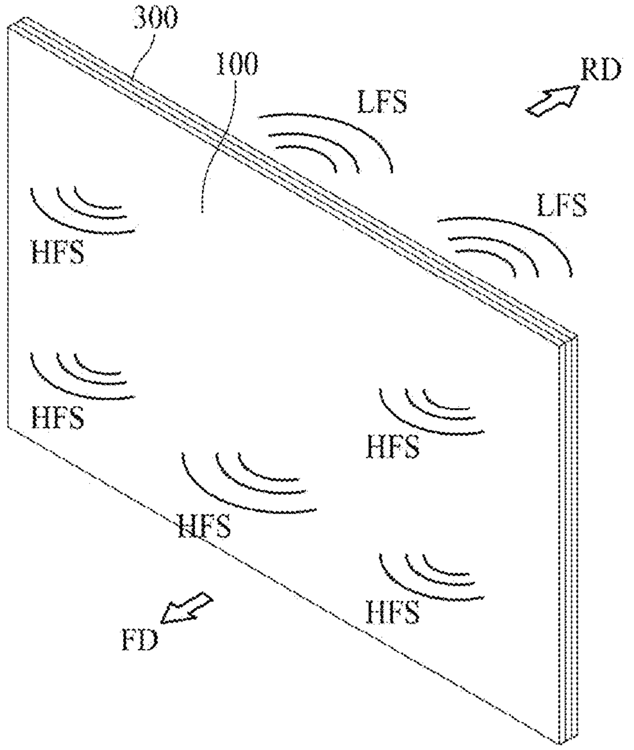
FIG. 12 illustrates sound output of the display apparatus according to another embodiment of the present disclosure.

With reference to FIGS. 11 to 12, the display apparatus according to another embodiment of the present disclosure includes a display panel 100 configured to display an image, a rear structure 300 configured to support a rear surface of the display panel 100, and first, second, third, fourth and fifth sound generating devices 210, 220, 230, 240 and 250 disposed between the display panel 100 and the rear structure 300. The first, second and third sound generating devices 210, 220 and 230 may be disposed in a lower area of the display panel. The first and second sound generating devices 210 and 220 include a first sound generating module attached to the rear surface of the display panel 100, and a second sound generating module disposed while being apart from the rear surface of the display panel 100. The fourth and fifth sound generating devices 240 and 250 may be disposed in an upper area of the display panel, and may be actuators for directly vibrating the rear surface of the display panel 100.

The display apparatus according to another embodiment of the present disclosure may have sound characteristics of 5.1 channels. According to one embodiment of the present disclosure, the display panel 100 according to the present disclosure may output sound in a high-pitched sound band independently controlled in each of the five areas to a front direction of the display panel 100, and also may output sound in a low-pitched sound band controlled in each of the two areas to a rear direction of the display panel 100.

FIGS. 13A to 13I are rear views illustrating other embodiments of display apparatus. There is a partition member 600 configured to divide the display panel 100 into a lower right area (LRA), a lower left area (LLA), a lower central area (LCA), an upper right area (URA) and an upper left area (ULA), and first, second, third, fourth and fifth sound generating devices 210, 220, 230, 240 and 250 respectively arranged in the lower right area (LRA), the lower left area (LLA), the lower central area (LCA), the upper right area (URA) and the upper left area (ULA). The partition member 600 may be interposed between the display panel 100 and the rear cover 300. According to one embodiment of the present disclosure, the partition member 600 may surround each of the first sound generating device and the second sound generating device, and the partition member 600 may divide each area provided with each of the first sound generating device 210, the second sound generating device 220, the third sound generating device 230, the fourth sound generating device 240 and the fifth sound generating device 250. Herein, each of the first to fifth sound generating devices independently generates sound in each corresponding area, and the partition member 600 prevents interference between sound generated in the neighboring area and sound generated in the distant area. Accordingly, the partition member 600 may prevent sound interference among sound generated in the lower right area (LRA) of the display panel 100, sound generated in the lower left area (LLA), sound generated in the lower central area (LCA), sound generated in the upper right area (URA), and sound generated in the upper left area (ULA). The partition member 600 may include first to ninth partition members 610, 620, 630, 640, 650, 660, 670, 680 and 690, and the first to ninth partition members 610, 620, 630, 640, 650, 660, 670, 680 and 690 may be formed in the structure of surrounding each of the lower right area (LRA), the lower left area (LLA), the upper central area (UCA), the upper right area (URA) and the upper left area (ULA). The second partition member 620, the third partition member 630, the fifth partition member 650 and the ninth partition member 690 may define the area of the display panel to which sound generated in the first sound generating device 210 is output, and the second partition member 620, the third partition member 630, the fourth partition member 640 and the eighth partition member 680 may define the area of the display panel to which sound generated in the second sound generating device 220 is output. The second partition member 620, the third partition member 630, the eighth partition member 680 and the ninth partition member 690 may define the area of the display panel to which sound generated in the third sound generating device 230 is output. The first partition member 610, the second partition member 620, the fifth partition member 650 and the seventh partition member 670 may define the area of the display panel to which sound generated in the fourth sound generating device 240 is output. The first partition member 610, the second partition member 620, the fourth partition member 640 and the sixth partition member 660 may define the area of the display panel to which sound generated in the fifth sound generating device 250 is output. As described in FIGS. 10A to 10G, an explanation for the occurrence of the standing wave will be omitted. In order to prevent the reduction of sound pressure by the standing wave generated due to the interference between the progressive wave and the reflected wave, a bent portion is formed in the partition member 600. The standing wave causing the reduction of sound pressure is generated at a point having the large progressive wave and the large reflected wave. Accordingly, the bent portion may be disposed in the point having the largest sound wave approaching from the sound generating device. With reference to FIGS. 10A to 10G, it is shown that the various shaped bent portion is disposed in the first sound generating device 210 to the fifth sound generating device 250. For example, in case of the partition member 600 surrounding the third sound generating device 230, the fourth sound generating device 240 and the fifth sound generating device 250 which generate the high-pitched sound (HFS) band, the bent portion may be vertically disposed so as to be aligned in the center of the sound generating device. Also, in the partition member 600 surrounding the first sound generating device 210 and the second sound generating device 220 which generate the high-pitched sound (HFS) band and the low-pitched sound (LFS) band, at the same time, the bent portion may be disposed while being vertically aligned in the center of the sound generating device. Although not shown in FIGS. 13A to 131, for the clean back design in the rear exterior surface of the final display product, at least two exciters having the small thickness may be disposed in each of the fourth sound generating device 240 and the fifth sound generating device 250 respectively disposed in the upper left area (ULA) and the upper right area (URA). An explanation for the above has been already described with reference to FIG. 10, whereby it will be omittable. With reference to FIGS. 13A to 13E, it is shown that the third sound generating device 230 disposed in the lower central area (LCA) of the rear surface of the display panel 100 is aligned on the same line in the horizontal direction with the first sound generating device 210 and the second sound generating device 220 respectively disposed in the lower right area (LRA) and the lower left area (LLA) adjacent to the lower central area (LCA). However, with reference to FIGS. 13F to 131, the third sound generating device 230 disposed in the lower central area (LCA) of the rear surface of the display panel 100 is not aligned on the same line in the horizontal direction with the first sound generating device 210 and the second sound generating device 220, but is apart from a central line. Owing to this arrangement, the progressing direction of sound generated from the first and second sound generating devices 210 and 220 at both sides of the display panel 100 is different from the progressing direction of sound generated from the third sound generating device 230 in the lower central area (LCA) of the display panel 100. For example, if the third sound generating device 230 disposed in the lower central area (LCA) of the display panel is positioned at a upper portion with respect to an alignment reference line of the first and second sound generating devices 210 and 220, the sound generated in the first and second sound generating devices propagates to the left and right directions of the front surface of the display panel 100, and the sound generated in the third sound generating device propagates to the middle and lower directions of the front surface of the display panel 100 by the interaction between the third sound generating device 230 and the first and second sound generating devices 210 and 220, thereby to realize a surround stereo sound effect.

Figure 14A:
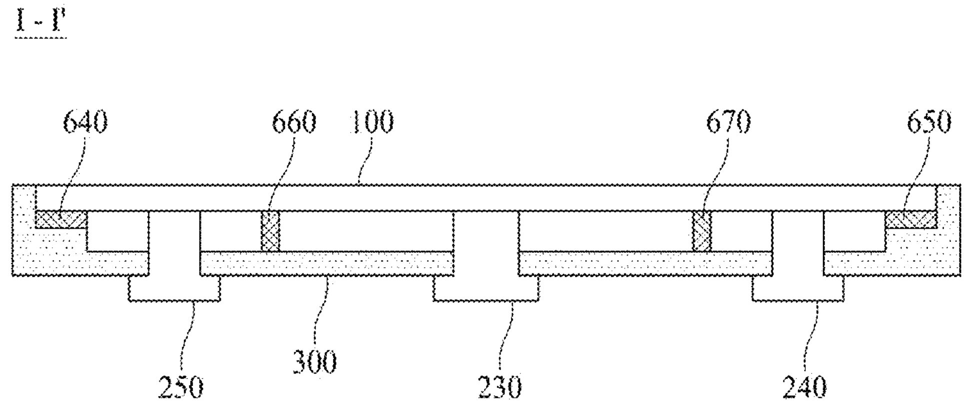
FIG. 14A is a cross-sectional view along line I-I' of FIG. 10A.

FIG. 14A is a cross-sectional along line I-I' of FIG. 10A.

With reference to FIG. 14A, the third to fifth sound generating devices may be exciters which are attached to the display panel 100 and are configured to directly vibrate the display panel so as to generate the high-pitched sound band. As described above, the third to fifth sound generating devices 230, 240 and 250, which are respectively provided in the upper central area (UCA), the upper right area (URA) and the upper left area (ULA) of the display panel, may independently output the high-pitched sound band to the respective upper central area (UCA), upper right area (URA) and upper left area (ULA). The rear cover 300 supports the corresponding exciters and the lateral surface of the display panel 100, and the step-shaped rear cover 300 is adhered to or combined with the partition member 640 and 650 disposed in the periphery of the display panel 100, whereby the upper right area (URA) and the upper left area (ULA) are perfectly sealed, and the independent sound may be output.

Figure 13A:
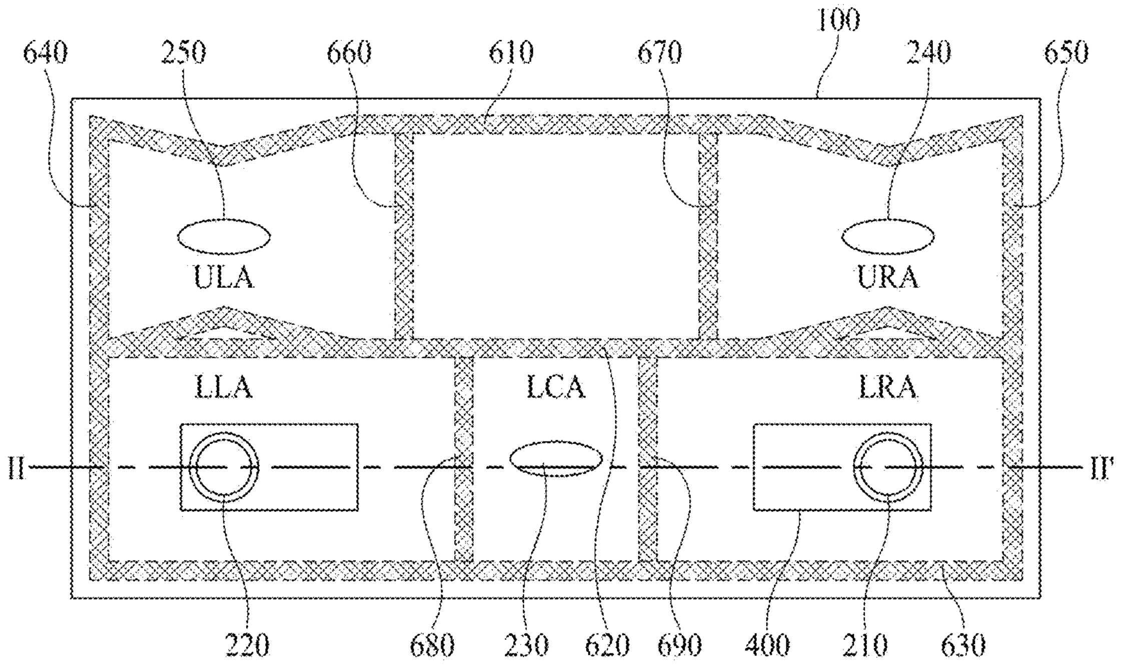
Figure 13B:
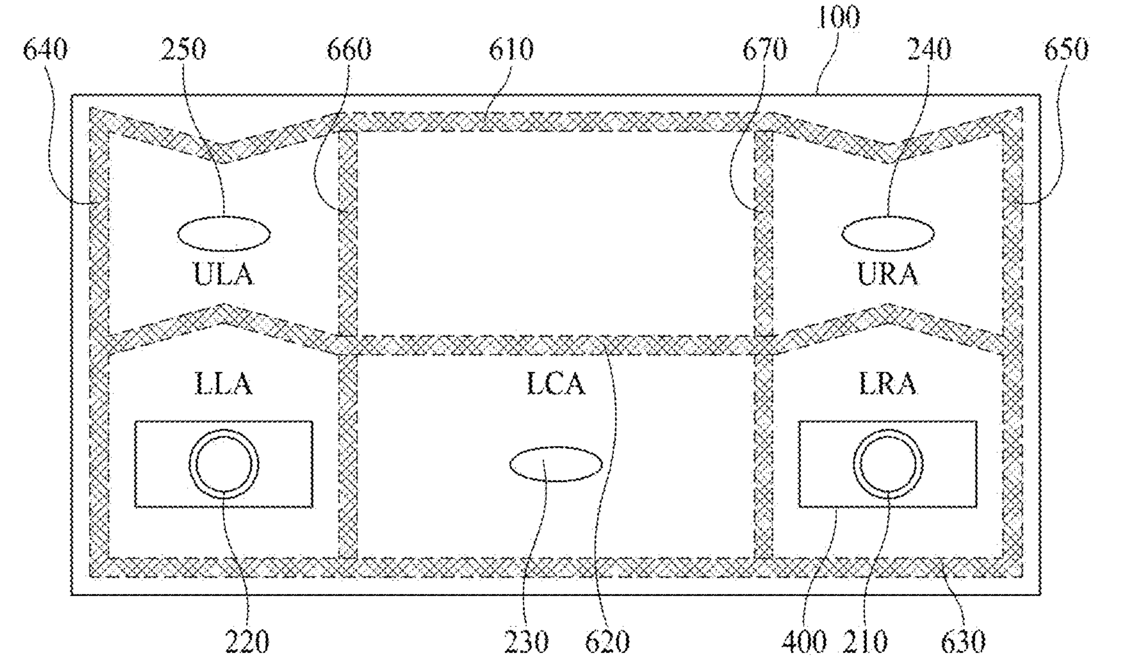
Figure 13C:
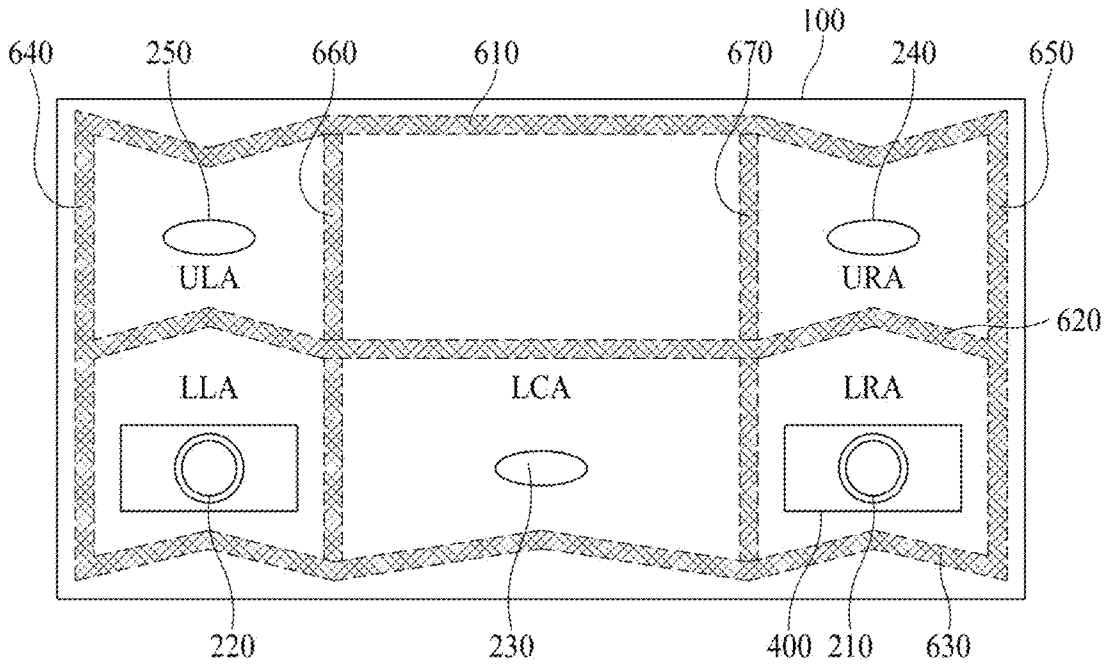
Figure 13D:
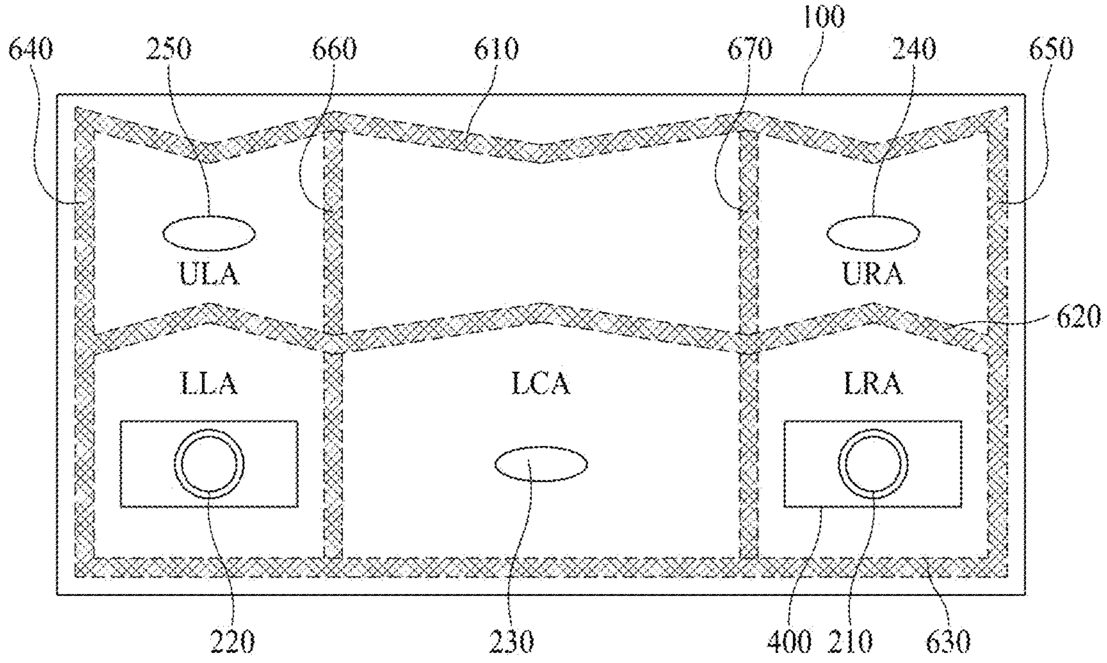
Figure 13E:
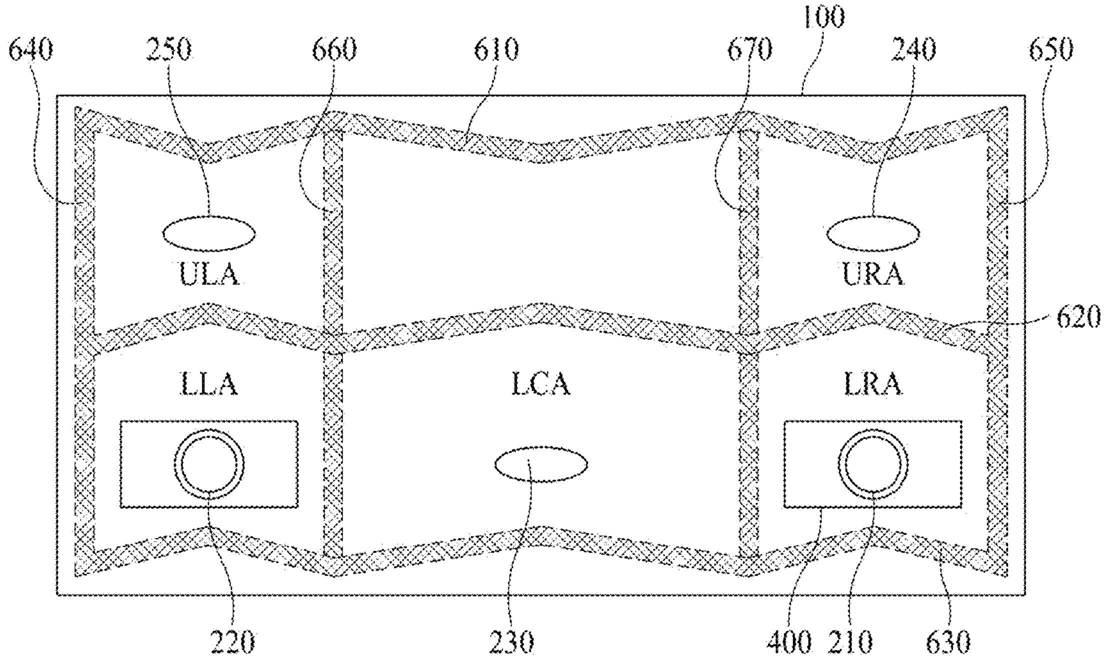
Figure 13F:
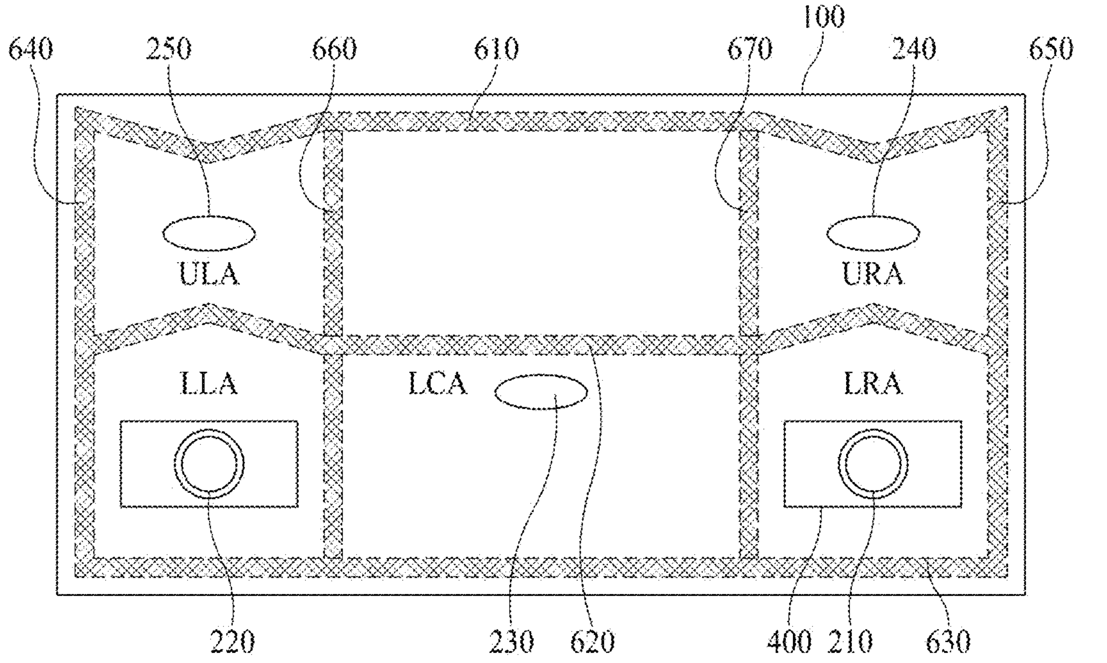
Figure 13G:
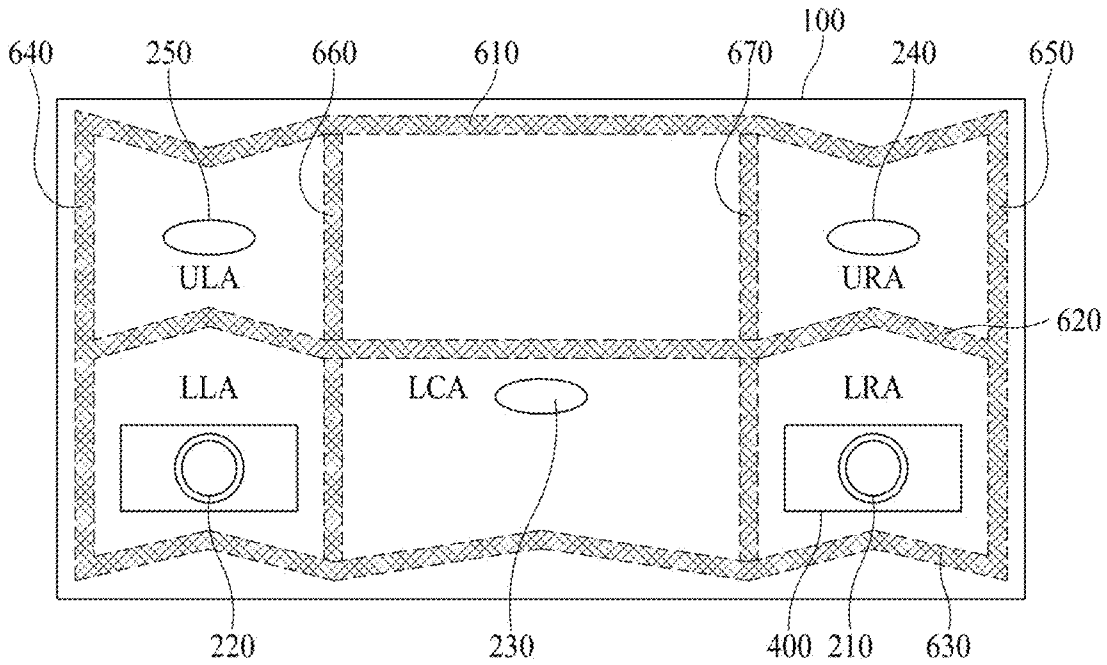
Figure 13H:
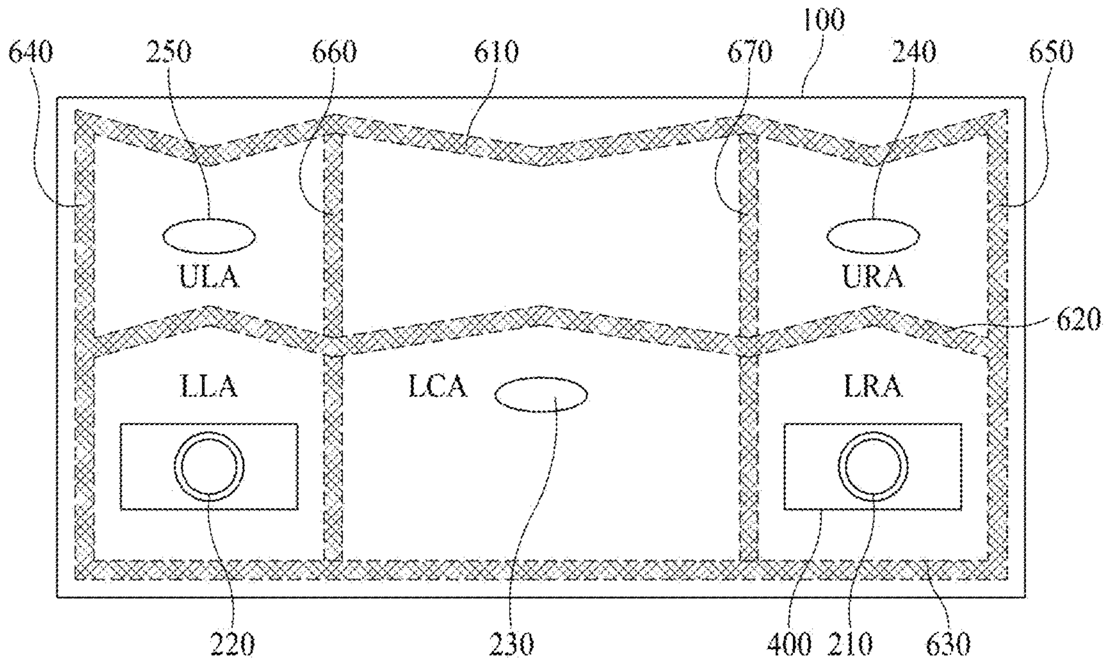
Figure 13I:
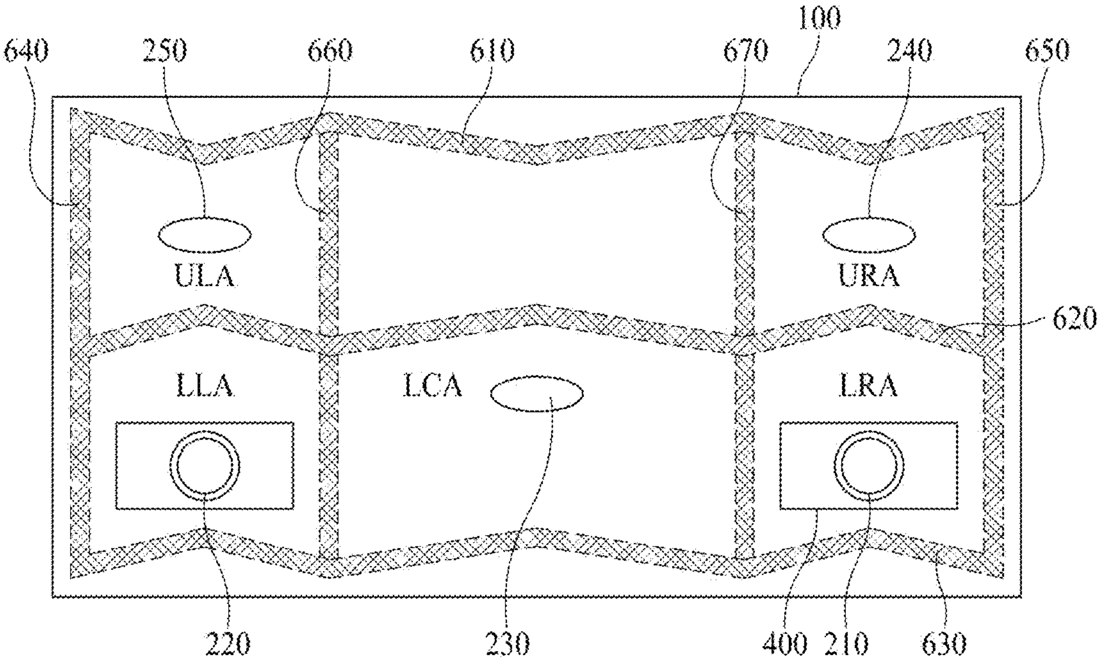
Figure 14B:
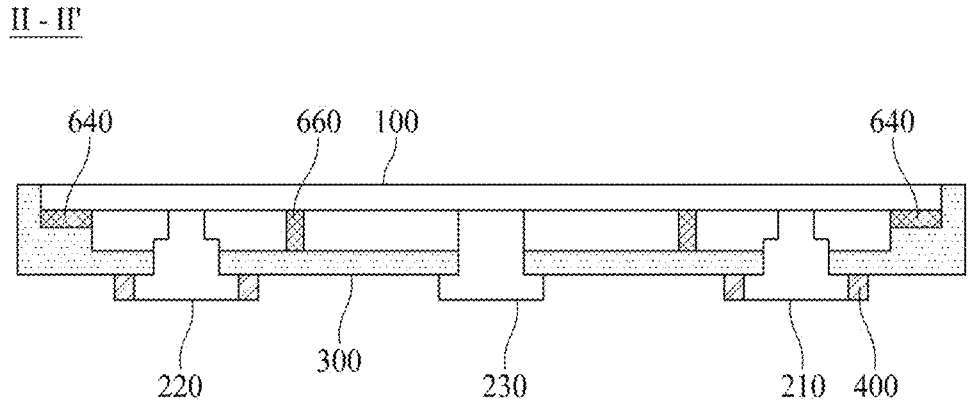
FIG. 14B is a cross-sectional view along line II-II' of FIG. 13A

FIG. 14B is a cross-sectional along line II-II' of FIG. 13A.

With reference to FIG. 14B, the first to third sound generating devices may be exciters which are attached to the display panel 100 and are configured to directly vibrate the display panel so as to generate the high-pitched sound band, and the first and second sound generating devices may further include the woofer which is apart from the display panel 100 and is configured to generate the low-pitched sound band, so that it is possible to realize a hybrid type. As described above, the first to third sound generating devices 210, 220 and 230 are respectively provided in the lower right area (LRA), the lower central area (LCA) and the lower left area (LLA) of the display panel. The hybrid type exciter is disposed in the lower right area (LRA) and the lower left area (LLA) so as to output the high-pitched sound band and the low-pitched sound band, and the exciter is disposed in the lower central area (LCA) so as to output the high-pitched sound band. The speaker box 400 configured to improve the low-pitched sound output efficiency may be combined with the lateral surface of the woofer configured to output the low-pitched sound band. The rear cover 300 supports the corresponding exciters and the lateral surface of the display panel 100, and the step-shaped rear cover 300 is adhered to or combined with the partition member 640 and 650 disposed in the periphery of the display panel 100, whereby the lower right area (LRA) and the lower left area (LLA) are perfectly sealed, and the independent sound may be output.

Figure 15A:
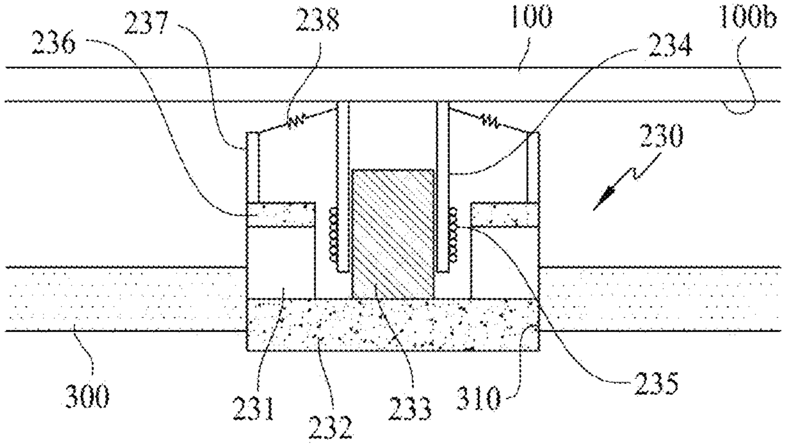
FIG. 15A is a cross-sectional view illustrating one embodiment of a sound generating device.
Figure 15B:
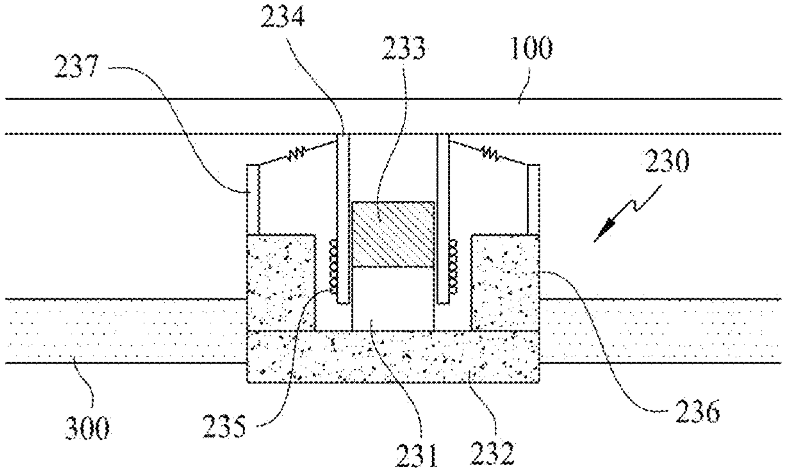
FIG. 15B is a cross-sectional view illustrating one embodiment of a sound generating device.

FIGS. 15A and 15B are cross-sectional views illustrating an embodiment of the sound generating device.

The sound generating device may be categorized into a first structure where a magnet is disposed at an external side of a coil, and a second structure where a magnet is disposed at an inner side of a coil. The first structure may be expressed as a dynamic type or external magnetic type, and the second structure may be expressed as a micro type or internal magnetic type.

FIG. 15A illustrates the first structure, and FIG. 15B illustrates the second structure.

With reference to FIG. 15A, the third sound generating device 230 may include a first plate 232, a magnet 231 on the first plate 232, a center pole 233 on the plate, a bobbin 234 disposed around the center pole 233, and a coil 235 wound on an outer circumferential surface of the bobbin 234. In an example, the magnet 231 is disposed on the first plate 232, and the second plate 236 is disposed on the magnet 231. The first plate 232 and the second plate 236 support the magnet 231, and fix the third sound generating device 230 to the rear cover 300. Accordingly, the first plate 232 may be fixed to a supporting hole formed in the rear cover 300, and the magnet 231 may be fixedly supported between the first plate 232 and the second plate 236.

At least one of the first plate 232 and the second plate 236 may be formed of a magnetic material such as iron (Fe). The plate is not limited to these terms, and may be referred to as yokes. The magnet 231 may use a sintered magnet of barium ferrite, and the magnet 231 may be formed of ferric oxide ($Fe2O_3$), barium carbonate ($BaCO_3$), neodymium (Nd) magnet, strontium ferrite with improved magnetic component, aluminum (Al), nickel (Ni), or alloy-casting magnet of cobalt (Co), but is not limited to these materials. For example, the neodymium magnet may be neodymium-iron-boron (Nd—Fe—B).

A frame 237 is disposed on the second plate 236 along the periphery of the first plate 232. The center pole 233 is disposed on the center of the first plate 232. The center pole 233 may be referred to as pole pieces. Here, the center pole 233 and the first plate 232 may be formed as one body.

The bobbin 234 is disposed to surround the center pole 233. The coil 235 is wound on a lower outer surface of the bobbin 234, and a sound generating current is applied to the coil 235. The bobbin 234 may be a ring-shaped structure of a paper or aluminum sheet, and the coil 235 may be wound on some area of the lower portion of the bobbin 234. The bobbin 234 together with the coil 235 may be expressed as a voice coil. A damper 238 may be disposed between some area of an upper portion of the bobbin 234 and the frame 237, and the damper may be known by other terms, such as an edge.

FIG. 15B illustrates the second structure where a magnet is disposed at an inner side of a coil.

With reference to FIG. 15B, the third sound generating device 230 includes a magnet 231 on a first plate 232, a center pole 233 on the magnet 231, a bobbin 234 disposed around the magnet 231 and the center pole 233, and a coil 235 wound on an outer surface of the bobbin 234.

Here, the first plate 232 may be fixed to a supporting hole formed in the rear cover 300. The magnet 231 is disposed on the first plate 232, and the center pole 233 is disposed on the magnet 231. The bobbin 234 is disposed to surround the magnet 231 and the center pole 233, and the coil 235 is wound on the outer surface of the bobbin 234.

A second plate 236 is disposed on the periphery of the first plate 232, and a frame 237 is disposed outside the periphery of the second plate 236. And, a damper 238 is disposed between the frame 237 and the bobbin. In comparison to the first structure where the magnet is disposed at the external side of the coil, the second structure has advantages of small leakage magnetic flux and decreased entire size of the sound generating device.

Also, the third to fifth sound generating devices are not limited to the structures of FIGS. 15A and 15B. Any sound generating device capable of generating sound by vibrating the display panel may be used.

Figure 16A:
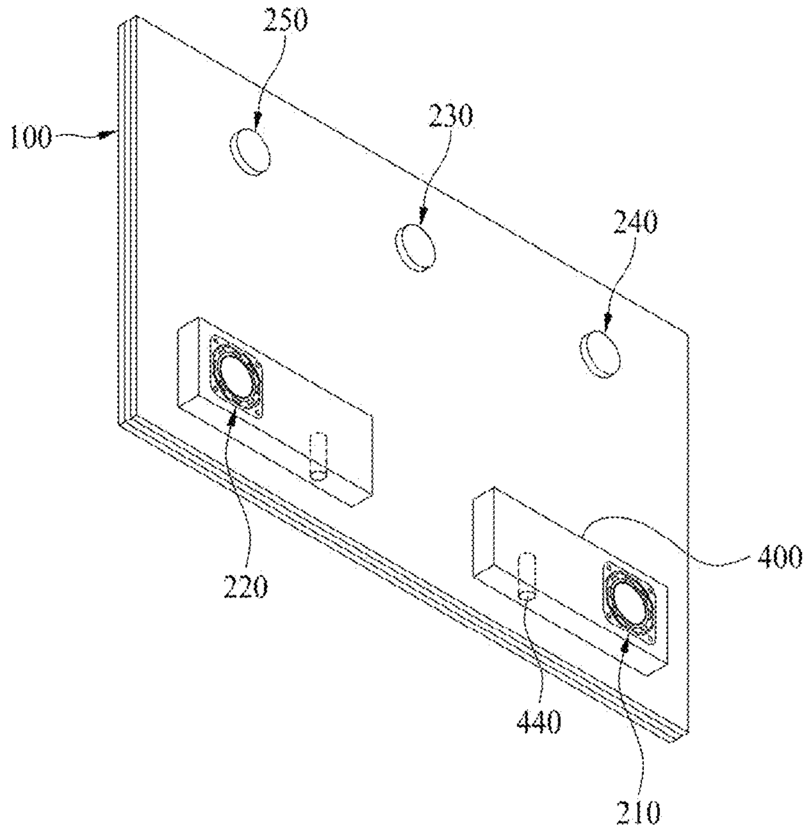
FIG. 16A is a rear view illustrating the display apparatus according to another embodiment of the present disclosure.
Figure 16B:
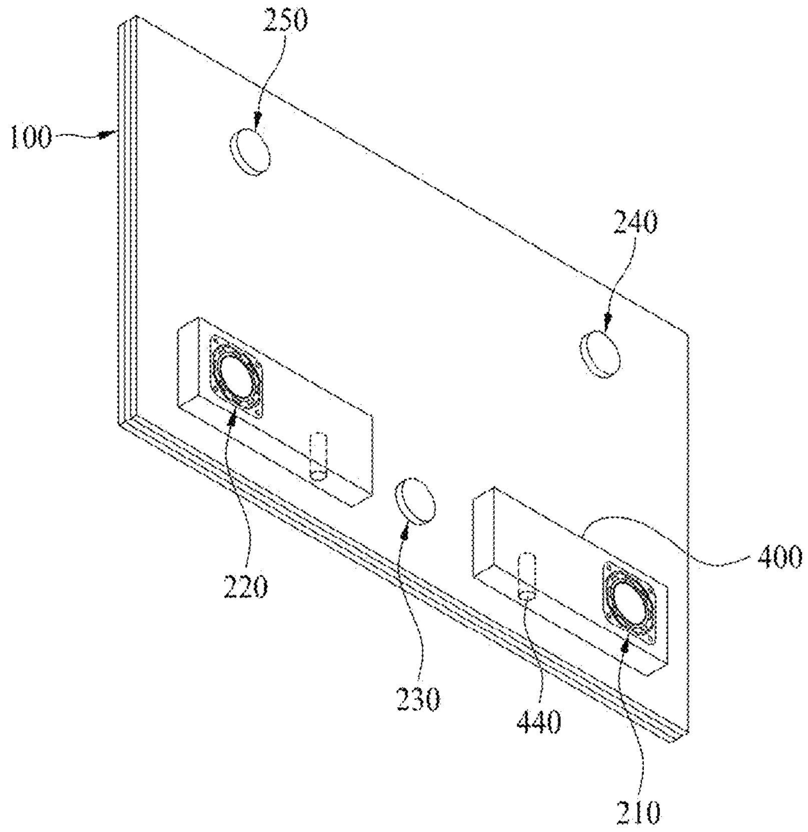
FIG. 16B is a rear view illustrating the display apparatus according to another embodiment of the present disclosure.

FIGS. 16A and 16B are rear views illustrating the display apparatus according to another embodiment of the present disclosure.

With reference to FIG. 16A, to improve low pitch sound characteristics, the first sound generating device and the second sound generating device may be provided in such a manner that a low-pitched sound reflection duct 440 is formed in the speaker box, and coupled to each of the first sound generating device and the second sound generating device. The low-pitched sound generated in the vibration plate of the second sound generating device is reflected on the first air gap (AG1), the second air gap (AG2) and the speaker box 400, and is then transmitted through the low-pitch sound reflection duct to enable improved output quality of low pitch sound.

With reference to FIG. 16B, unlike FIG. 16A, the third sound generating device may be disposed between the first sound generating device of the lower area and the second sound generating device. This arrangement is configured to output the high-pitched sound band from the first, second, fourth and fifth sound generating devices 210, 220, 240 and 250, and to output the low-pitched sound band from the first and second sound generating devices 210 and 220. In this case, the third sound generating device 230 is utilized to express an important sound of a screen or a main character's voice, thereby to enhance an immersion of a user who watches the image of the display apparatus.

Figure 17:
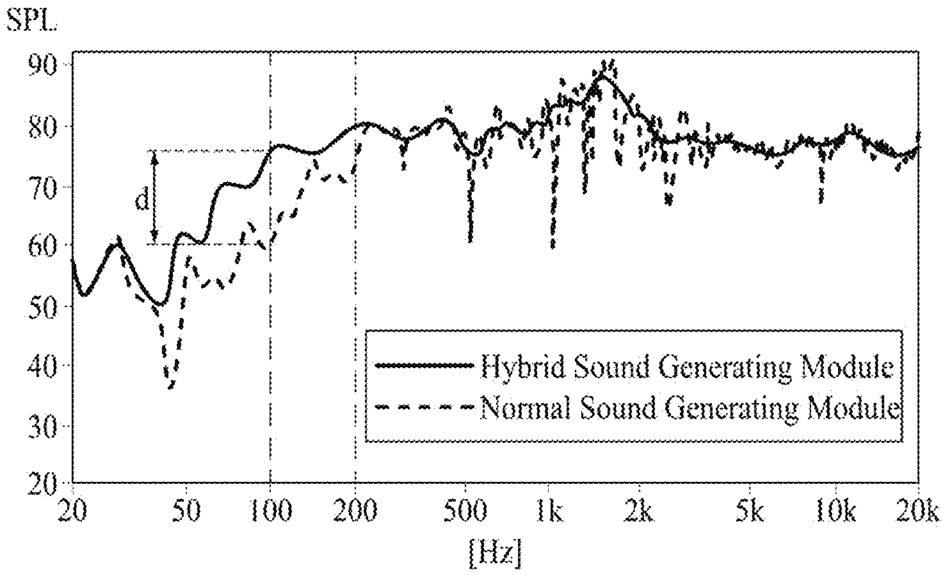
FIG. 17 is a graph illustrating sound pressure characteristics of the display apparatus according to one embodiment of the present disclosure.

FIG. 17 is a graph illustrating sound pressure characteristics of the display apparatus according to one embodiment of the present disclosure. In FIG. 17, a solid line shows sound pressure characteristics of a hybrid sound generating module with improved output characteristics of low-pitched sound band, which includes a first sound generating module and a second sound generating module, and a dotted line shows sound pressure characteristics of a normal sound generating module capable of generating sound by directly vibrating the display panel. In FIG. 17, a horizontal axis indicates a frequency (Hz), and a vertical axis indicates a sound pressure level (SPL, dB).

With reference to FIG. 17, the hybrid sound generating module and the normal sound generating module have similar sound pressure characteristics in the middle-pitched and high-pitched sound band of 200 Hz or more than 200 Hz. Meanwhile, the sound pressure characteristics of the low-pitched sound band less than 200 Hz in the hybrid sound generating module is remarkably higher than the sound pressure characteristics of the low-pitched sound band less than 200 Hz in the normal sound generating module. For example, the sound pressure characteristics measured at 100 Hz in the hybrid sound generating module may be higher by 'd' in comparison to 60 dB corresponding to the maximum sound pressure of the normal sound generating module, wherein 'd' is about 15 dB.

The display apparatus according to the embodiment of the present disclosure may include a liquid crystal display (LCD) device, a field emission display (FED) device, an organic light emitting display (OLED) device, and a quantum dot display device.

The display apparatus according to the embodiment of the present disclosure may include equipment displays including complete product or final product of LCM or OLED module, for example, notebook computer, television, computer monitor, automotive display, or vehicle display, and set electronic devices or set device (set apparatus) such as mobile electronic devices of smartphone or electronic pad.

The display apparatus according to the embodiments of the present disclosure may be explained as follows.

According to an embodiment of the present disclosure, a display apparatus may comprise a display panel configured to display an image; a sound generating device on a rear surface of the display panel; a rear cover on the rear surface of the display panel and configured to support the sound generating device; a partition member between the rear surface of the display panel and the rear cover and configured to divide the display panel into first, second, third, fourth and fifth areas; and first, second, third, fourth and fifth sound generating devices attached to the rear surface of the display panel and configured to vibrate the display panel, wherein the first, second, third, fourth and fifth sound generating devices are in the first, second, third, fourth and fifth areas, respectively.

According to one or more embodiments, the sound generating device may have sound output characteristics of 5.1 channels.

According to one or more embodiments, the first and second sound generating device may include hybrid exciters, and wherein the third, fourth, and fifth sound generating devices include exciters.

According to one or more embodiments, the partition member may include a bent portion, and the first and second sound generating devices may be vertically aligned in the bent portion.

According to one or more embodiments, the first and second areas may be positioned in a lower area of the display panel, and the third, fourth and fifth areas may be in an upper area of the display panel above the first and second areas.

According to one or more embodiments, the third, fourth and fifth sound generating devices may be aligned in a horizontal direction.

According to one or more embodiments, the fourth and fifth sound generating devices may be aligned along a reference line in a first horizontal direction, and the third sound generating device may be spaced apart from the reference line.

According to one or more embodiments, the first, second and third sound generating devices may be in a lower area of the display panel, and the fourth and fifth sound generating devices may be in an upper area of the display panel above the first, second and third sound generating devices.

According to one or more embodiments, the first and second sound generating devices may include hybrid exciters, and the third, fourth, and fifth sound generating devices may include exciters.

According to one or more embodiments, the third sound generating device may include an exciter capable of transmitting a human's voice, and the fourth and fifth sound generating devices include exciters capable of transmitting an object's sound.

According to an embodiment of the present disclosure, a display apparatus may comprise a display panel configured to display an image; a sound generating device on a rear surface of the display panel; a rear cover on the rear surface of the display panel and configured to support the sound generating device; and a partition member between the rear surface of the display panel and the rear cover and configured to divide the display panel into first, second, third, fourth and fifth areas, wherein the sound generating device includes a first sound generating module attached to the rear surface of the display panel; a second sound generating module spaced apart from the rear surface of the display panel; and a frame configured to accommodate the first sound generating module and the second sound generating module.

According to one or more embodiments, the display apparatus may further include a speaker box configured to accommodate the frame.

According to one or more embodiments, the speaker box may be in the first and second areas.

According to one or more embodiments, the partition member between the first area and the second area may include a bent portion with at least one bent surface toward the first sound generating module and the second sound generating module.

According to one or more embodiments, the frame may be in each of the first area and the second area, and a third sound generating module may additionally be in the third, fourth, and fifth areas.

According to one or more embodiments, the first and second areas may be in a lower area of the display panel, and the third, fourth and fifth areas may be in an upper area of the display panel above the first and second areas.

According to one or more embodiments, the first, second, and third areas may be in a lower area of the display panel, and the fourth and fifth areas may be in an upper area of the display panel above the first, second and third areas.

According to one or more embodiments, the frame disposed in the first and second areas and the third sound generating module disposed in the third area may be aligned along a reference line in horizontal direction.

According to one or more embodiments, the frame disposed in the first area and the second may be aligned along a reference line in a horizontal direction, and the third sound generating module in the third area may be disposed at a constant distance from the reference line.

According to one or more embodiments, the first sound generating module and the second sound generating module may be vertically aligned in an end of the bent portion.

According to one or more embodiments, the rear cover may be configured to support the sound generating device, the rear cover may include a first hole in which the sound generating device is mounted, and a second hole may be configured to discharge rear sound generated by the second sound generating module of the sound generating device.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising: a display panel configured to display an image; one or more sound generating devices at a rear surface of the display panel; and a rear cover configured to support the one or more sound generating device, wherein the one or more sound generating devices is configured to output a high-pitched sound band and configured to output a low-pitched sound band at the same time, and wherein one or more second sound generating devices include: a first sound generating module configured to output the high-pitched sound band; a second sound generating module configured to output the low-pitched sound band; and a frame supported at the rear cover and configured to accommodate the first sound generating module and the second sound generating module.

2. The display apparatus of claim 1, wherein:

the high-pitched sound band is output to a front direction of the display panel, and the low-pitched sound band is output to a rear direction of the display panel.

3. The display apparatus of claim 1, wherein the first sound generating module and the second sound generating module are configured to vibrate in different vibration modes or at different frequencies from each other.

4. The display apparatus of claim 1, wherein:

the first sound generating module is connected to the rear surface of the display panel, and the second sound generating module is spaced apart from the rear surface of the display panel.

5. The display apparatus of claim 1, wherein the rear cover includes:

a first hole in which the sound generating device is inserted, and a second hole configured to discharge rear sound generated by the sound generating device.

6. The display apparatus of claim 1, wherein the first sound generating module comprises:

a first magnet disposed at the frame;

a first plate disposed at an upper end of the first magnet;

a first exciter surrounding the first magnet and the first plate; and a bobbin ring between the first exciter and the display panel.

7. The display apparatus of claim 6, wherein the second sound generating module comprises:

a second magnet disposed at the frame;

a second plate disposed at an upper end of the second magnet;

a second exciter having a hollow section, wherein the second exciter surrounds the second magnet and the second plate; and a vibration plate attached to the second exciter, wherein in the hollow section of the second exciter, the first exciter is disposed away from the second exciter.

8. The display apparatus of claim 7, further comprising:

a first damper between the first exciter and the second plate; and a second damper between the second exciter and the frame.

9. The display apparatus of claim 7, further comprising:

a first air gap in the rear surface of the display panel; and a second air gap in a periphery of the vibration plate.

10. The display apparatus of claim 9, wherein:

the first sound generating module is configured to output a sound having the high-pitched sound band, and the second sound generating module is configured to output a sound having the low-pitched sound band by vibration of at least one of the first air gap and the second air gap.

11. The display apparatus of claim 9, wherein:

the frame includes at least one hole, and the second sound generating module is configured to output the sound having the low-pitched sound band by vibration of at least one of the first air gap and the second air gap by the at least one hole.

12. The display apparatus of claim 11, further comprising a speaker box configured to accommodate the frame.

13. The display apparatus of claim 12, wherein:

the speaker box is configured to include an inner space to accommodate the frame, and the at least one hole of the frame is connected to the inner space of the speaker box.

14. The display apparatus of claim 1, further comprising a partition member between the rear surface of the display panel and the rear cover and configured to divide the display panel into a lower area and an upper area.

15. The display apparatus of claim 14, wherein the partition member surrounding the one or more sound generating devices.

16. The display apparatus of claim 15, wherein the partition member includes a bent portion with at least one bent surface toward the one or more sound generating devices.

17. The display apparatus of claim 14, wherein the one or more sound generating devices is configured to output a sound in the high-pitched sound band independently controlled in the upper area, and to output a sound in the low-pitched sound band independently controlled in the lower area.

18. The display apparatus of claim 17, further comprising a speaker box disposed in the lower area, and wherein the speaker box includes a low-pitched sound reflection duct.

19. A display apparatus, comprising:

a display panel configured to display an image;

one or more sound generating devices at a rear surface of the display panel; and a rear cover configured to support the one or more sound generating device, wherein the one or more sound generating devices is configured to output a high-pitched sound band and configured to output a low-pitched sound band at the same time, and wherein the one or more sound generating devices include a hybrid exciter.

20. A display apparatus, comprising:
a display panel configured to display an image;
one or more sound generating devices at a rear surface of the display panel; and
a rear cover configured to support the one or more sound generating device,
wherein the one or more sound generating devices is configured to output a high-pitched sound band and configured to output a low-pitched sound band at the same time,
wherein the high-pitched sound band is output to a front direction of the display panel, and
wherein the low-pitched sound band is output to a rear direction of the display panel.

* * * * *